US012649170B2

(12) United States Patent (10) Patent No.: US 12,649,170 B2
Marinelli et al. (45) Date of Patent: Jun. 9, 2026

(54) ROLL COATING-BASED PREPARATION METHODS FOR ADHESIVE BONDING OF ALUMINUM ALLOYS, AND PRODUCTS RELATING TO THE SAME

(71) Applicant: ARCONIC TECHNOLOGIES LLC, Pittsburgh, PA (US)

(72) Inventors: James M. Marinelli, Murrysville, PA (US); Kirsten L. Genson, LeClaire, IA (US); John R. McAllister, New Kensington, PA (US); David M. Keltz, Apollo, PA (US); John L. Keener, Freeport, PA (US); Christopher M. Fiorina, Lower Burrell, PA (US); Ryan N. Scott, Plum, PA (US)

(73) Assignee: ARCONIC TECHNOLOGIES LLC, Pittsburgh, PA (US)

( * ) Notice: Subject to any disclaimer, the term of this patent is extended or adjusted under 35 U.S.C. 154(b) by 0 days.

(21) Appl. No.: 16/749,719

(22) Filed: Jan. 22, 2020

(65) Prior Publication Data

US 2020/0156107 A1 May 21, 2020

Related U.S. Application Data

(63) Continuation of application No. PCT/US2018/043548, filed on Jul. 24, 2018.

(Continued)

(51) Int. Cl.
*B05D 7/14* (2006.01)
*B05D 1/28* (2006.01)
(Continued)

(52) U.S. Cl.
CPC ................. *B05D 7/14* (2013.01); *B05D 1/28* (2013.01); *B05D 3/0254* (2013.01); *B05D 3/102* (2013.01); *C09J 5/02* (2013.01); *C09J 2400/166* (2013.01)

(58) Field of Classification Search
CPC . B05D 1/28; B05D 7/14; B05D 3/102; B05D 3/0254; C09J 5/02
See application file for complete search history.

(56) References Cited

U.S. PATENT DOCUMENTS 3,224,908 A * 12/1965 Duch .................... C08F 275/00
148/248
5,103,550 A 4/1992 Wefers et al.
(Continued)

FOREIGN PATENT DOCUMENTS

JP 2015-163731 9/2015
WO WO-9100150 A1 * 1/1991 ........... B05C 1/0826

OTHER PUBLICATIONS

ASM Handbook vol. 5: Surface Engineering "Surface Engineering of Aluminum and Aluminum Alloys" p. 784-804 © 1994 (Year: 1994).*

(Continued)

*Primary Examiner* — Nathan H Empie
(74) *Attorney, Agent, or Firm* — Greenberg Traurig, LLP

(57) ABSTRACT

Methods for preparing an aluminum alloy sheet product for adhesive bonding are disclosed. A method may include preparing an aluminum alloy product for roll coating and roll coating an aqueous functionalization solution onto the prepared aluminum alloy product. For the roll coating step, the aqueous functionalization solution may include from 0.1 to 5.0 wt. % of active ingredients. The active ingredients may include a first monomer component and a second polymer component. The amount of second polymer component in the aqueous functionalization solution may be (Continued)

greater than an amount of the first monomer component in the aqueous functionalization solution.

14 Claims, 7 Drawing Sheets

Related U.S. Application Data

(60) Provisional application No. 62/537,343, filed on Jul. 26, 2017.

(51) Int. Cl.
| | | |
|---|---|---|
| B05D 3/02 | (2006.01) | |
| B05D 3/10 | (2006.01) | |
| C09J 5/02 | (2006.01) | |

(56) References Cited

U.S. PATENT DOCUMENTS

| | | | | |
|---|---|---|---|---|
| 5,463,804 | A | 11/1995 | McCleary et al. | |
| 6,020,030 | A | 2/2000 | Guthrie et al. | |
| 6,030,710 | A | 2/2000 | Nitowski et al. | |
| 6,167,609 | B1 * | 1/2001 | Marinelli | C09J 5/02 |
| | | | | 29/469.5 |
| 6,475,301 | B1 * | 11/2002 | Grab | B23K 35/3605 |
| | | | | 148/26 |
| 9,511,392 | B2 | 12/2016 | Sebralla et al. | |
| 2004/0065389 | A1 | 4/2004 | Kolberg et al. | |
| 2006/0169363 | A1 * | 8/2006 | Sohi | C23C 22/44 |
| | | | | 148/243 |
| 2016/0168677 | A1 * | 6/2016 | Ribes | C22C 21/00 |
| | | | | 148/439 |
| 2016/0319440 | A1 | 11/2016 | Bull et al. | |

OTHER PUBLICATIONS

International Search Report and Written Opinion, dated Nov. 9, 2018, from corresponding International App. No. PCT/US2018/043548.

* cited by examiner

Coating Against Tension

Direct Roll Coating

Reverse Roll Coating

300

Prepare Aluminum Alloy Product for Roll Coating
302

Rinse Prepared Aluminum Alloy Product
304

Roll Coat Functionalization Solution onto Prepared Aluminum Alloy Product
306

Dry the Roll Coated Aluminum Alloy Product
308

ROLL COATING-BASED PREPARATION METHODS FOR ADHESIVE BONDING OF ALUMINUM ALLOYS, AND PRODUCTS RELATING TO THE SAME

CROSS-REFERENCE TO RELATED APPLICATION

This application is a continuation of International Patent App. No. PCT/US2018/043548, filed Jul. 24, 2018, which claims the benefit of priority to U.S. Patent Application No. 62/537,343, filed Jul. 26, 2017, each of which is incorporated herein by reference in its entirety.

BACKGROUND

Aluminum alloy products are used in a number of industries, including the automotive industry. In some instances, aluminum alloys need to be bonded to other materials.

SUMMARY

Broadly, the present disclosure relates to roll coating-based methods for preparing aluminum alloy products for adhesive bonding. In particular, and referring now to FIGS. 1-7, a method (300) may be implemented, at least in part, through a roll coating process (100). The method (300) may comprise preparing (302) an aluminum alloy sheet product (103) for the roll coating process (100). The aluminum alloy sheet product (103) includes an upper surface (106) and a lower surface (108). Where the aluminum alloy sheet product (103) is received as a coil (104), the preparing step (302) may include an uncoiling step (102) to expose the upper (106) and lower (108) surfaces for subsequent steps of the method (300) during the process (100).

The preparing step (302) may also include a cleaning step (110) (e.g., an alkaline or acidic cleaning step). This cleaning step (110) may include the use of a cleaning solution to facilitate removal of residues, debris (e.g., lubricant(s), oil(s), dirt), and/or other items from the upper (106) and/or lower (108) surfaces that might disrupt the subsequent steps of the method (300) during the process (100). In other embodiments, the cleaning step (110) is not employed. In a method (400), as shown in FIG. 4, the cleaning step (110) may include the upper (106) and/or lower (108) surfaces being sprayed with and/or immersed in a cleaning solution.

In one embodiment, the cleaning solution is maintained at a temperature of from 125° F. to 175° F. In another embodiment, the cleaning solution is maintained at a temperature of from 130° F. to 150° F. In yet another embodiment, the cleaning solution is maintained at a temperature of about 140° F.

As noted above, the cleaning solution may be an alkaline solution or an acidic solution. Multiple cleaning solutions may be used. Alkaline solutions may contain one or more suitable bases useful for removing residues, debris, and/or other items from the upper (106) and/or lower (108) surface of the aluminum alloy sheet product (103), such as solutions including sodium hydroxide, potassium hydroxide, alkaline carbonate, buffered alkaline solutions, among others. Other suitable bases may be used for the cleaning step (110), as appropriate. Acidic solutions may contain one or more suitable acids useful for removing residues, debris, and/or other items from the upper (106) and/or lower (108) surface of the aluminum alloy sheet product (103), such as sulfuric acid. Additives, such as, without limitation, surfactants, stabilizers, accelerators, and other compounds, may be added to the cleaning solution, as appropriate. In one embodiment, a cleaning solution is an alkaline solution comprising potassium hydroxide. In another embodiment, a cleaning solution is a sulfuric acid solution.

The cleaning solution used for the cleaning step (110) may be a commercially available preparation, either as a pre-formulated liquid concentrate, as a ready-to-use liquid, or as a solid preparation for dissolving into a suitable solvent. The commercially available cleaning solutions may include application-specific additives provided either as a part of the liquid or solid product, or as a separate product to be added as needed and in the desired proportion.

The cleaning step (110) may include contacting (e.g., by spraying and/or immersing) the upper (106) and/or lower (108) surfaces of the aluminum alloy sheet product (103) with the cleaning solution for a predetermined period of time. The predetermined period of time for the cleaning step (110) may be selected to be a time sufficient to facilitate removal of residues, debris, and/or other items from the upper (106) and/or lower (108) surfaces. For the cleaning step (110), the predetermined period of time may be selected based upon the known or anticipated amount of debris, residue and/or other extraneous matter present on the upper (106) and/or lower (108) surfaces of the as-received aluminum alloy sheet product (103). The predetermined period of time for the cleaning step (110) may also be selected based upon factors such as the specific formulation of the cleaning solution (e.g., its composition and/or pH) and the type, temper and/or composition of the aluminum alloy sheet product (103) (e.g., 5xxx, 6xxx, or 7xxx aluminum alloys).

The time of the cleaning step (110) may be any suitable amount of time to clean the aluminum alloy coil surface without etching, such as from one second to 4 minutes. In one embodiment, the cleaning time is at least 1 second. In another embodiment, the cleaning time is at least 2 seconds. In yet another embodiment, the cleaning time is at least 5 seconds. In another embodiment, the cleaning time is at least 10 seconds. In one embodiment, the cleaning time is not greater than 3 minutes. In one embodiment, the cleaning time is not greater than 2 minutes. In one embodiment, the cleaning time is not greater than 1 minute. In another embodiment, the cleaning time is not greater than 30 seconds. In yet another embodiment, the cleaning time is not greater than 25 seconds. In another embodiment, the cleaning time is not greater than 20 seconds. In yet another embodiment, the cleaning time is not greater than 15 seconds. In one embodiment, the cleaning time is from 1 second to 30 seconds. In another embodiment, the cleaning time for the cleaning step (110) is from 2 second to 25 seconds. In yet another embodiment, the cleaning time for the cleaning step (110) is from 3 second to 20 seconds. In still another embodiment, the cleaning time for the cleaning step (110) is from 4 second to 15 seconds. In another embodiment, the cleaning time for the cleaning step (110) is from 4 second to 10 seconds. In yet another embodiment, the cleaning time for the cleaning step (110) is from 4 seconds to 10 seconds. In still another embodiment, the cleaning time for the cleaning step (110) is from 2 seconds to 8 seconds. In another embodiment, the cleaning time for the cleaning step (110) is from 2 seconds to 6 seconds. In yet another embodiment, the cleaning time for the cleaning step (110) is about 4 seconds.

The preparing step (302) may include a first rinse (112) of the upper (106) and/or lower (108) surfaces after completing the cleaning step (110). This first rinse (112) may include rinsing with water (e.g., deionized water) so as to remove debris and/or residual chemicals. In one embodiment, the water for the first rinse (112) is maintained at room temperature. In another embodiment, the water for the first rinse (112) is heated to a temperature that is greater than room temperature. The first rinse (112) may also include a plurality of rinsing steps. The preparation step (302) may also include a verification of water break-free behavior of the upper (106) and/or lower (108) surfaces by, for instance, visual inspection during and/or after the first rinse (112). A water break-free surface means that when the surface is subsequently wet with water, it flows over the surface uniformly and does not retract (i.e., is not repelled) or form areas where there is little to no solution.

The method (300) may also include an acid deoxidization step (114). In one embodiment, the acid deoxidization step (114) may be performed after the first rinse (112) is completed. This acid deoxidization step (114) facilitates at least a reduction in a thickness of a surface oxide layer present on the upper (106) and/or lower (108) surfaces that might disrupt the subsequent steps of the method (300) during the process (100). In the method (400), as shown in FIG. 4, the acid deoxidization step (114) may include the upper (106) and/or lower (108) surfaces being sprayed with and/or immersed in an acidic solution. In one embodiment, the deoxidization solution is maintained at a temperature of from room temperature to 185° F. In another embodiment, the deoxidization solution is maintained at a temperature of from 135° F. to 185° F. In still another embodiment, the deoxidization solution is maintained at a temperature of at least 165° F. In yet another embodiment, the deoxidization solution is maintained at a temperature of about 170° F.

The deoxidization solution may contain any suitable acid useful for deoxidizing the upper (106) and/or lower (108) surface of the aluminum alloy sheet product (103), including nitric acid, sulfuric acid, and phosphoric acid, among others. Other suitable acids may be used for the acid deoxidization step (114), including those described in U.S. Pat. No. 6,167,609 to Marinelli et al., which is incorporated by reference herein in its entirety. Additives including, without limitation, surfactants, stabilizers, accelerators, and other compounds, may be added to the acidic solution as appropriate. In one embodiment, the deoxidization solution comprises nitric acid. In embodiments where nitric acid is used, the nitric acid may be at a concentration of, for example, from 0.1 to 10 wt. %. In another embodiment where nitric acid is used, the nitric acid may be at a concentration of 2 to 6 wt. %. In yet another embodiment where nitric acid is used, the nitric acid may be at a concentration of about 4 wt. %.

The deoxidization solution used for the deoxidization step (114) may also include a commercially available preparation, either as a pre-formulated liquid concentrate, as a ready-to-use liquid, or as a solid preparation for dissolving into a suitable solvent. The commercially available acidic solutions may include application-specific additives provided either as a part of the liquid or solid product, or as a separate product to be added as needed and in the desired proportion. In one embodiment, the commercially available acidic solution preparation is BONDERITE® C-IC 243. In embodiments where BONDERITE® C-IC 243 is used, the BONDERITE® C-IC 243 may be at a concentration of, for example, from 12 to 16 percent by volume (vol. %). In another embodiment where BONDERITE® C-IC 243 is used, the BONDERITE® C-IC 243 may be at a concentration of about 14 vol. %.

The deoxidization step (114) may include contacting (e.g., by spraying and/or immersing) the upper (106) and/or lower (108) surfaces of the aluminum alloy sheet product (103)

with the acidic solution for a predetermined period of time. The predetermined period of time for the acid deoxidization step (114) may be selected to be a time sufficient to facilitate at least a reduction in the thickness of the surface oxide layer. For the acid deoxidization step (114), the predetermined period of time may be selected based upon the known and/or anticipated thickness and/or composition of the surface oxide layer present on the upper (106) and/or lower (108) surfaces. The predetermined period of time for the acid deoxidization step (114) may also be selected based upon factors such as the specific formulation of the acidic solution (e.g., its composition and/or pH) and the type, temper and/or composition of the aluminum alloy sheet product (103) (e.g., 5xxx, 6xxx, or 7xxx aluminum alloys).

The time of the deoxidation step (114) may be any suitable amount of time to deoxidize the aluminum alloy coil, as disclosed herein, such as a deoxidation time of from one second to 4 minutes. In one embodiment, the deoxidation time is at least 1 second. In another embodiment, the deoxidation time is at least 2 seconds. In yet another embodiment, the deoxidation time is at least 5 seconds. In another embodiment, the deoxidation time is at least 10 seconds. In one embodiment, the deoxidation time is not greater than 3 minutes. In one embodiment, the deoxidation time is not greater than 2 minutes. In one embodiment, the deoxidation time is not greater than 1 minute. In another embodiment, the deoxidation time is not greater than 30 seconds. In yet another embodiment, the deoxidation time is not greater than 25 seconds. In another embodiment, the deoxidation time is not greater than 20 seconds. In yet another embodiment, the deoxidation time is not greater than 15 seconds. In one embodiment, the deoxidation time is from 1 second to 30 seconds. In another embodiment, the deoxidation time for the deoxidation step (114) is from 2 second to 25 seconds. In yet another embodiment, the deoxidation time for the deoxidation step (114) is from 3 second to 20 seconds. In still another embodiment, the deoxidation time for the deoxidation step (114) is from 4 second to 15 seconds. In another embodiment, the deoxidation time for the deoxidation step (114) is from 4 second to 10 seconds. In yet another embodiment, the deoxidation time for the deoxidation step (114) is from 4 seconds to 10 seconds. In still another embodiment, the deoxidation time for the deoxidation step (114) is from 2 seconds to 8 seconds. In another embodiment, the deoxidation time for the deoxidation step (114) is from 2 seconds to 6 seconds. In yet another embodiment, the deoxidation time for the deoxidation step (114) is about 4 seconds.

The preparing step (302) may also include a second rinse (116) of the upper (106) and/or lower (108) surfaces after completing the acid deoxidization step (114). This second rinse (116) may include rinsing with water (e.g., deionized water) so as to remove debris and/or residual chemical. In one embodiment, the water for the second rinse (116) is maintained at room temperature. In another embodiment, the water for the second rinse (116) is heated to a temperature that is greater than room temperature. The second rinse (116) may also include a plurality of rinsing steps. The preparation step (302) may also include a verification of water break-free behavior of the upper (106) and/or lower (108) surfaces by, for instance, visual inspection during and/or after the second rinse (116).

The method (300) may include a roll coating step (306). In one embodiment, the roll coating step (306) may be performed after a rinsing step (304) (e.g., the first (112) and/or second (116) rinse) is completed, including after verification of water-break free behavior of the upper (106)

and/or lower (108) surfaces. As shown in FIG. 1, the roll coating step (306) may be performed using a roll coating apparatus (118). The roll coating step (306) may be performed on one or both of the upper (106) and lower (108) surfaces of the aluminum alloy sheet product (103). In one embodiment, the roll coating apparatus (118) may include one roller in cases where only one of the upper (106) and lower (108) surfaces are to be roll coated during the roll coating step (306). In another embodiment, the roll coating apparatus (118) may include a plurality of rollers (e.g., at least a first (120) roller and a second (122) roller) in cases where both the upper (106) and lower (108) surfaces are to be roll coated during the roll coating step (306). The rinsing step (304) is optional, and may not be required in all cases (e.g., when the preparing step (302) includes a cleaning step and its own separate rinse).

Generally, for the roll coating step (306), an aqueous functionalization solution may be supplied to the first (120) and/or the second (122) roller via at least one bath containing the functionalization solution. The functionalization solution may be maintained at a predetermined concentration and/or temperature. The aqueous functionalization solution applied via the roll coating step (306) creates a functionalized layer upon the upper (106) and/or lower (108) surfaces, as the case may be. In one embodiment, the roll coating apparatus (118) includes one bath if only one of the upper (106) and lower (108) surfaces are to be roll coated during the roll coating step (306). In another embodiment, the roll coating apparatus (118) includes two baths if both the upper (106) and lower (106) surfaces are to be roll coated. The two separate baths may also be used in cases where the upper (106) and lower (106) surfaces are to be roll coated with functionalization solutions maintained at different concentrations and/or temperatures.

For instance, a first bath (124) may contain a first supply of the functionalization solution and a second bath (126) may contain a second supply of the functionalization solution. The first supply of the functionalization solution in the first bath (124) may be maintained at a first concentration and at a first temperature for roll coating onto the upper surface (106) via the first roller (120). Similarly, the second supply of the functionalization solution in the second bath (126) may be maintained at a second concentration and at a second temperature for roll coating onto the lower surface (108) via the second roller (122). In one embodiment, at least one of the concentration and the temperature of the functionalization solution differs in the first bath (124) as compared to the second bath (126). In another embodiment, the concentration and the temperature of the functionalization solution in the first bath (124) is the same as it is in the second bath (126).

The process (100) may be a continuous coil-to-coil process, where the aluminum alloy sheet product (103) is fed through the one or more rollers of the roll coating apparatus (118) during the roll coating step (306) at a predetermined and/or controlled feed rate. In one embodiment, the feed rate is from 60 feet per minute (fpm) to 600 fpm. In another embodiment, the feed rate is at least 100 fpm. In yet another embodiment, the feed rate is at least 125 fpm. In still another embodiment, the feed rate is at least 150 fpm. In another embodiment, the feed rate is at least 175 fpm. In yet another embodiment, the feed rate is at least 200 fpm. In still another embodiment, the feed rate is at least 225 fpm. In another embodiment, the feed rate is at least 250 fpm. In yet another embodiment, the feed rate is at least 275 fpm. In still another embodiment, the feed rate is at least 300 fpm.

In a method (500), shown in FIG. 5, the roll coating step (302) may include a maintaining step (502). In the maintaining step (502), the aqueous functionalization solution that is roll coated onto the upper (106) and/or lower (108) surfaces of the prepared aluminum alloy sheet product (103) may be maintained at a predetermined temperature. In one embodiment, the functionalization solution may be maintained at a temperature of from room temperature to 110° F. In another embodiment, the functionalization solution may be maintained at a temperature of from 85° F. to 100° F. In yet another embodiment, the functionalization solution may be maintained at a temperature of about 90° F.

Where both the upper (106) and lower (108) surfaces are to be roll coated during the roll coating step (306), in one embodiment, for example, a first volume of functionalization solution (e.g., in the first bath (124)) for the upper surface (106) may be maintained at a first temperature that is generally equal to (e.g., to within 10% of) a second temperature of a second volume of functionalization solution (e.g., in the second bath (126)) for the lower surface (108). In another embodiment where both the upper (106) and lower (108) surfaces are to be roll coated, the first and second volumes of functionalization solutions may be maintained at differing temperatures.

The aqueous functionalization solution may also include a solution mixture of two or more active ingredients. The active ingredients of the functionalization solution may include a first monomer component ("A") and a second polymer component ("B"). In one embodiment, the functionalization solution may be a phosphorus-containing organic acid. In embodiments where the functionalization solution is a phosphorus-containing organic acid, component A may be a monomer, e.g., as per U.S. Pat. No. 6,167,609, and component B may be a copolymer, such as per U.S. Pat. No. 6,020,030.

The total concentration of the active ingredients in the functionalization solution (e.g., an (A+B) concentration, or [A+B]) is generally from 0.1 to 5 wt. %. In one embodiment, [A+B] is at least 0.2 wt. %. In another embodiment, [A+B] is at least 0.3 wt. %. In yet another embodiment, [A+B] is at least 0.4 wt. %. In another embodiment, [A+B] is at least 0.5 wt. %. In yet another embodiment, [A+B] is at least 0.6 wt. %. In another embodiment, [A+B] is at least 0.625 wt. %. In one embodiment, [A+B] is not greater than 4.5 wt. %. In another embodiment, [A+B] is not greater than 4 wt. %. In yet another embodiment, [A+B] is not greater than 3 wt. %. In another embodiment, [A+B] is not greater than 2.5 wt. %. In yet another embodiment, [A+B] is not greater than 2 wt. %. In another embodiment, [A+B] is not greater than 1.75 wt. %. In yet another embodiment, [A+B] is not greater than 1.5 wt. %. In another embodiment, [A+B] is not greater than 1.25 wt. %. In yet another embodiment, [A+B] is not greater than 1 wt. %.

In one embodiment, [A+B] is from about 0.1 to about 4.5 wt. %. In another embodiment, [A+B] is from about 0.1 to about 4 wt. %. In yet another embodiment, [A+B] is from about 0.1 to about 3 wt. %. In still another embodiment, [A+B] is from about 0.1 to about 2.5 wt. %. In yet another embodiment, [A+B] is from about 0.2 to about 2.5 wt. %. In still another embodiment, [A+B] is from about 0.3 to about 2.5 wt. %. In another embodiment, [A+B] is from about 0.4 to about 2.5 wt. %. In yet another embodiment, [A+B] is from about 0.5 to about 2.5 wt. %. In still another embodiment, [A+B] is from about 0.6 to about 2.5 wt. %. In yet another embodiment, [A+B] is from about 0.625 to about 2 wt. %. In another embodiment, [A+B] is from about 0.625 to about 1.75 wt. %. In still another embodiment, [A+B] is from about 0.625 to about 1.5 wt. %. In yet another embodiment, [A+B] is from about 0.625 to about 1.25 wt. %.

In a method (600), shown in FIG. 6, the roll coating step (306) may include maintaining a first volume (e.g., in the first bath 124) at a first [A+B] for roll coating onto the upper surface (106). Similarly, the roll coating step (306) may include maintaining a second volume (e.g., in the second bath 126) at a second [A+B] for roll coating onto the lower surface (108). In one embodiment where the roll coating step (306) is performed on both the upper (106) and lower (108) surfaces, the first [A+B] may be generally equal to the second [A+B]. In another embodiment where the roll coating step (306) is performed on both the upper (106) and lower (108) surfaces, the first [A+B] may be different from the second [A+B]. In one embodiment where the first [A+B] is different from the second [A+B], the first [A+B] may be less than the second [A+B]. In another embodiment where the first [A+B] is different from the second [A+B], the first [A+B] may be greater than the second [A+B].

In the method (600), the first [A+B] and the second [A+B] may differ from one another by a predetermined amount. In one embodiment where the first [A+B] is less than the second [A+B], the first [A+B] is at least 0.25 wt. % less than the second [A+B]. In another embodiment where the first [A+B] is less than the second [A+B], the first [A+B] may be at least 0.50 wt. % less than the second [A+B]. In still another embodiment where the first [A+B] is less than the second [A+B], the first [A+B] is at least 0.6 wt. % less than the second [A+B].

Likewise, in one embodiment where the second [A+B] is less than the first [A+B], the second [A+B] is at least 0.25 wt. % less than the first [A+B]. In another embodiment where the second [A+B] is less than the first [A+B], the second [A+B] is at least 0.50 wt. % less than the first [A+B]. In still another embodiment where the second [A+B] is less than the first [A+B], the second [A+B] is at least 0.6 wt. % less than the first [A+B].

In the method (600), the first [A+B] may be maintained at a predetermined first concentration. In one embodiment, the first [A+B] is from 0.1 to 5 wt. %. In one embodiment, the first [A+B] is at least 0.2 wt. %. In yet another embodiment, the first [A+B] is at least 0.3 wt. %. In another embodiment, the first [A+B] is at least 0.4 wt. %. In yet another embodiment, the first [A+B] is at least 0.5 wt. %. In another embodiment, the first [A+B] is at least 0.6 wt. %. In yet another embodiment, the first [A+B] is at least 0.625 wt. %. In one embodiment, the first [A+B] is not greater than 4.5 wt. %. In yet another embodiment, the first [A+B] is not greater than 4 wt. %. In another embodiment, the first [A+B] is not greater than 3 wt. %. In yet another embodiment, the first [A+B] is not greater than 2.5 wt. %. In yet another embodiment, the first [A+B] is not greater than 2 wt. %. In another embodiment, the first [A+B] is not greater than 1.75 wt. %. In yet another embodiment, the first [A+B] is not greater than 1.5 wt. %. In another embodiment, the first [A+B] is not greater than 1.25 wt. %. In yet another embodiment, the first [A+B] is not greater than 1 wt. %.

In one embodiment, the first [A+B] is from about 0.1 to about 4.5 wt. %. In another embodiment, the first [A+B] is from about 0.1 to about 4 wt. %. In yet another embodiment, the first [A+B] is from about 0.1 to about 3 wt. %. In still another embodiment, the first [A+B] is from about 0.1 to about 2.5 wt. %. In yet another embodiment, the first [A+B] is from about 0.2 to about 2.5 wt. %. In still another embodiment, the first [A+B] is from about 0.3 to about 2.5 wt. %. In another embodiment, the first [A+B] is from about 0.4 to about 2.5 wt. %. In yet another embodiment, the first [A+B] is from about 0.5 to about 2.5 wt. %. In still another embodiment, the first [A+B] is from about 0.6 to about 2.5 wt. %. In yet another embodiment, the first [A+B] is from about 0.625 to about 2 wt. %. In another embodiment, the first [A+B] is from about 0.625 to about 1.75 wt. %. In still another embodiment, the first [A+B] is from about 0.625 to about 1.5 wt. %. In yet another embodiment, the first [A+B] is from about 0.625 to about 1.25 wt. %.

Similarly, in the method (600), the second [A+B] may be maintained at a predetermined second concentration. In one embodiment, the second [A+B] is from 0.1 to 5 wt. %. In one embodiment, the second [A+B] is at least 0.2 wt. %. In yet another embodiment, the second [A+B] is at least 0.3 wt. %. In another embodiment, the second [A+B] is at least 0.4 wt. %. In yet another embodiment, the second [A+B] is at least 0.5 wt. %. In another embodiment, the second [A+B] is at least 0.6 wt. %. In yet another embodiment, the second [A+B] is at least 0.625 wt. %. In one embodiment, the second [A+B] is not greater than 4.5 wt. %. In yet another embodiment, the second [A+B] is not greater than 4 wt. %. In another embodiment, the second [A+B] is not greater than 3 wt. %. In yet another embodiment, the second [A+B] is not greater than 2.5 wt. %. In yet another embodiment, the second [A+B] is not greater than 2 wt. %. In another embodiment, the second [A+B] is not greater than 1.75 wt. %. In yet another embodiment, the second [A+B] is not greater than 1.5 wt. %. In another embodiment, the second [A+B] is not greater than 1.25 wt. %. In yet another embodiment, the second [A+B] is not greater than 1 wt. %.

In one embodiment, the second [A+B] is from about 0.1 to about 4.5 wt. %. In another embodiment, the second [A+B] is from about 0.1 to about 4 wt. %. In yet another embodiment, the second [A+B] is from about 0.1 to about 3 wt. %. In still another embodiment, the second [A+B] is from about 0.1 to about 2.5 wt. %. In yet another embodiment, the second [A+B] is from about 0.2 to about 2.5 wt. %. In still another embodiment, the second [A+B] is from about 0.3 to about 2.5 wt. %. In another embodiment, the second [A+B] is from about 0.4 to about 2.5 wt. %. In yet another embodiment, the second [A+B] is from about 0.5 to about 2.5 wt. %. In still another embodiment, the second [A+B] is from about 0.6 to about 2.5 wt. %. In yet another embodiment, the second [A+B] is from about 0.625 to about 2 wt. %. In another embodiment, the second [A+B] is from about 0.625 to about 1.75 wt. %. In still another embodiment, the second [A+B] is from about 0.625 to about 1.5 wt. %. In yet another embodiment, the second [A+B] is from about 0.625 to about 1.25 wt. %. In still another embodiment, the second [A+B] is at least 1 wt. %.

Again referring to FIG. 5, in the method (500), the roll coating step (306) may include maintaining an amount of the second polymer component in the aqueous functionalization solution at a level (e.g., concentration of B, or [B]) that is generally equal to an amount of the first monomer component (e.g., concentration of A, or [A]). The roll coating step (306) may also include maintaining the amount of the second polymer component in the aqueous functionalization solution at a level (e.g., concentration of B, or [B]) that differs from the amount of the first monomer component (e.g., concentration of A, or [A]). In one embodiment where [A] and [B] differ in the functionalization solution, [A] may be less than [B]. In another embodiment where [A] differs from [B], [A] may be greater than [B].

The roll coating step (306) may also include maintaining [A] and/or [B] at a predetermined concentration in the first (124) and/or second baths (126). For instance, in one embodiment where [B] is maintained at a predetermined concentration in the functionalization solution, [B] may be maintained at a concentration of from 0.1 to 5 wt. %. In one embodiment where [B] is maintained at a predetermined concentration, [B] is maintained at a concentration of at least 0.2 wt. %. In another embodiment where [B] is maintained at a predetermined concentration, [B] is maintained at a concentration of at least 0.3 wt. %. In another embodiment where [B] is maintained at a predetermined concentration, [B] is maintained at a concentration of at least 0.4 wt. %. In yet another embodiment where [B] is maintained at a predetermined concentration, [B] is maintained at a concentration of at least 0.5 wt. %. In another embodiment where [B] is maintained at a predetermined concentration, [B] is maintained at a concentration of at least 0.6 wt. %. In yet another embodiment where [B] is maintained at a predetermined concentration, [B] is maintained at a concentration of at least 0.625 wt. %. In one embodiment where [B] is maintained at a predetermined concentration, [B] is maintained at a concentration of not greater than 4.5 wt. %. In yet another embodiment, where [B] is maintained at a predetermined concentration, [B] is maintained at a concentration of not greater than 4 wt. %. In another embodiment, where [B] is maintained at a predetermined concentration, [B] is maintained at a concentration of not greater than 3 wt. %. In yet another embodiment, where [B] is maintained at a predetermined concentration, [B] is maintained at a concentration of not greater than 2.5 wt. %. In another embodiment, where [B] is maintained at a predetermined concentration, [B] is maintained at a concentration of not greater than 2 wt. %. In yet another embodiment, where [B] is maintained at a predetermined concentration, [B] is maintained at a concentration of not greater than 1.75 wt. %. In another embodiment, where [B] is maintained at a predetermined concentration, [B] is maintained at a concentration of not greater than 1.5 wt. %. In yet another embodiment, where [B] is maintained at a predetermined concentration, [B] is maintained at a concentration of not greater than 1.25 wt. %.

In one embodiment where [B] is maintained at a predetermined concentration, [B] may be maintained at a concentration of from about 0.1 to about 4.5 wt. %. In another embodiment where [B] is maintained at a predetermined concentration, [B] may be maintained at a concentration of from about 0.1 to about 4 wt. %. In yet another embodiment where [B] is maintained at a predetermined concentration, [B] may be maintained at a concentration of from about 0.1 to about 3 wt. %. In still another embodiment where [B] is maintained at a predetermined concentration, [B] may be maintained at a concentration of from about 0.1 to about 2.5 wt. %. In yet another embodiment where [B] is maintained at a predetermined concentration, [B] may be maintained at a concentration of from about 0.2 to about 2.5 wt. %. In still another embodiment where [B] is maintained at a predetermined concentration, [B] may be maintained at a concentration of from about 0.3 to about 2.5 wt. %. In another embodiment where [B] is maintained at a predetermined concentration, [B] may be maintained at a concentration of from about 0.4 to about 2.5 wt. %. In yet another embodiment where [B] is maintained at a predetermined concentration, [B] may be maintained at a concentration of from about 0.5 to about 2.5 wt. %. In still another embodiment where [B] is maintained at a predetermined concentration, [B] may be maintained at a concentration of from about 0.6 to about 2.5 wt. %. In yet another embodiment where [B] is maintained at a predetermined concentration, [B] may be maintained at a concentration of from about 0.625 to about 2 wt. %. In another embodiment where [B] is maintained at a predetermined concentration, [B] may be maintained at a concentration of from about 0.625 to about 1.75 wt. %. In still another embodiment where [B] is maintained at a predetermined concentration, [B] may be maintained at a concentration of from about 0.625 to about 1.5 wt. %. In yet another embodiment where [B] is maintained at a predetermined concentration, [B] may be maintained at a concentration of from about 0.625 to about 1.25 wt. %.

Likewise, in one embodiment where [A] is maintained at a predetermined concentration in the functionalization solution, [A] may be maintained at a concentration of from 0.1 to 5 wt. %. In one embodiment where [A] is maintained at a predetermined concentration, [A] is maintained at a concentration of at least 0.2 wt. %. In yet another embodiment, where [A] is maintained at a predetermined concentration, [A] is maintained at a concentration of at least 0.3 wt. %. In another embodiment where [A] is maintained at a predetermined concentration, [A] is maintained at a concentration of at least 0.4 wt. %. In yet another embodiment where [A] is maintained at a predetermined concentration, [A] is maintained at a concentration of at least 0.5 wt. %. In another embodiment where [A] is maintained at a predetermined concentration, [A] is maintained at a concentration of at least 0.6 wt. %. In yet another embodiment where [A] is maintained at a predetermined concentration, [A] is maintained at a concentration of at least 0.625 wt. %. In one embodiment where [A] is maintained at a predetermined concentration, [A] is maintained at a concentration of not greater than 4.5 wt. %. In yet another embodiment where [A] is maintained at a predetermined concentration, [A] is maintained at a concentration of not greater than 4 wt. %. In another embodiment where [A] is maintained at a predetermined concentration, [A] is maintained at a concentration of not greater than 3 wt. %. In yet another embodiment where [A] is maintained at a predetermined concentration, [A] is maintained at a concentration of not greater than 2.5 wt. %. In another embodiment where [A] is maintained at a predetermined concentration, [A] is maintained at a concentration of not greater than 2 wt. %. In yet another embodiment where [A] is maintained at a predetermined concentration, [A] is maintained at a concentration of not greater than 1.75 wt. %. In another embodiment where [A] is maintained at a predetermined concentration, [A] is maintained at a concentration of not greater than 1.5 wt. %. In yet another embodiment where [A] is maintained at a predetermined concentration, [A] is maintained at a concentration of not greater than 1.25 wt. %. In one embodiment where [A] is maintained at a predetermined concentration, [A] may be maintained at a concentration of from about 0.1 to about 4.5 wt. %. In another embodiment where [A] is maintained at a predetermined concentration, [A] may be maintained at a concentration of from about 0.1 to about 4 wt. %. In yet another embodiment where [A] is maintained at a predetermined concentration, [A] may be maintained at a concentration of from about 0.1 to about 3 wt. %. In still another embodiment where [A] is maintained at a predetermined concentration, [A] may be maintained at a concentration of from about 0.1 to about 2.5 wt. %. In yet another embodiment where [A] is maintained at a predetermined concentration, [A] may be maintained at a concentration of from about 0.2 to about 2.5 wt. %. In still another embodiment where [A] is maintained at a predetermined concentration, [A] may be maintained at a concentration of from about 0.3 to about 2.5 wt. %. In another embodiment where [A] is maintained at a predetermined concentration, [A] may be maintained at a concentration of from about 0.4 to about 2.5 wt. %. In yet another embodiment where [A] is maintained at a predetermined concentration, [A] may be maintained at a concentration of from about 0.5 to about 2.5 wt. %. In still another embodiment where [A] is maintained at a predetermined concentration, [A] may be maintained at a concentration of from about 0.6 to about 2.5 wt. %. In yet another embodiment where [A] is maintained at a predetermined concentration, [A] may be maintained at a concentration of from about 0.625 to about 2 wt. %. In another embodiment where [A] is maintained at a predetermined concentration, [A] may be maintained at a concentration of from about 0.625 to about 1.75 wt. %. In still another embodiment where [A] is maintained at a predetermined concentration, [A] may be maintained at a concentration of from about 0.625 to about 1.5 wt. %. In yet another embodiment where [A] is maintained at a predetermined concentration, [A] may be maintained at a concentration of from about 0.625 to about 1.25 wt. %.

Also, in the method (500), [A] and [B] in the functionalization solution may differ from one another by a predetermined amount, which may be defined as a ratio of the amount of the A component to the amount of the B component (i.e., A:B) in the functionalization solution. The roll coating step (306) may include maintaining A:B in the functionalization solution at a predetermined ratio. The concentration of component A may be maintained to be less than the concentration of component B in the functionalization solution, and thus A:B may likewise be maintained at a ratio of less than 1:1. In one embodiment, A:B is maintained at a ratio of at least 1:19 (A:B). In another embodiment, A:B is maintained at a ratio of at least 1:9. In yet another embodiment, A:B is maintained at a ratio of at least 1:4. In one embodiment, A:B is maintained at a ratio of not greater than 7:13 (A:B). In another embodiment, A:B is maintained at a ratio of not greater than 1:9. In yet another embodiment, A:B is maintained at a ratio of not greater than 1:4. In one embodiment, A:B is maintained at a ratio that is generally equal to 1:19. In another embodiment, A:B is maintained at a ratio that is generally equal to 1:9. In yet another embodiment, A:B is maintained at a ratio that is generally equal to 1:4. In another embodiment, A:B is maintained at a ratio that is generally equal to 7:13.

The concentration of component A may instead be maintained to be greater than the concentration of component B in the functionalization solution, and thus A:B may likewise be maintained at a ratio of greater than 1:1. For instance, in one embodiment, A:B may be maintained at a ratio of not greater than 2.5:1 (A:B). In another embodiment, A:B may be maintained at a ratio of not greater than 2.0:1. In yet another embodiment, A:B may be maintained at a ratio of not greater than 1.5:1. The concentration of component A may instead be maintained in the functionalization solution to be generally equal to the concentration of component B in the functionalization solution, and thus A:B may likewise be maintained to be generally equal to 1:1.

The roll coating step (306) may also include maintaining the functionalization solutions for the upper (206) and lower (208) surfaces at a first A:B and second A:B, respectively. In one embodiment, the first A:B is maintained to be generally equal to the second A:B. In another embodiment, the first A:B is maintained to be different from the second A:B. In one embodiment, the first A:B is maintained to be greater than the second A:B. In another embodiment, the first A:B is maintained to be less than the second A:B.

The roll coating apparatus (118) and the number of rollers it uses for the roll coating step (306) may be varied in methods (300), (500) and (600) depending on the particular application involved (e.g., whether one or both of the upper (106) and lower (108) surfaces are to roll coated). Illustrated in FIGS. 2A-2C are three alternative embodiments of the roll coating apparatus (118). In each of the embodiments shown in FIGS. 2A-2C, either one or two of the rollers (e.g., a first (120) and/or a second (122) roller) may make contact with the upper (106) and/or lower (108) surface of the aluminum alloy sheet product (103), as the case may be. In one embodiment, as shown in FIG. 2A, the roll coating apparatus (118) may implement the roll coating step (306) as coating against tension where the first roller (120) may contact the upper surface (106) and a third roller (202) may contact the first roller (120) to apply the functionalization solution thereto. Also, in the coating against tension embodiment of FIG. 2A, the first roller (120) may meter the functionalization solution onto the upper surface (106) as the aluminum alloy sheet product (103) progresses through the roll coating apparatus (118). Also, in the coating against tension embodiment, a rotational direction of the first roller (120) may be either complimentary with or opposite to a direction at which the aluminum alloy sheet product (103) moves with respect to the roll coating apparatus (118). In cases where the lower surface (108) is to be roll coated using the coating against tension embodiment, the setup may generally be the same as described above with reference to the upper surface (106), except that the first roller (120) is replaced with the second roller (122) that may contact the lower surface (108), and where the third roller (202) may contact the second roller (122).

In another embodiment, shown in FIG. 2B, the roll coating apparatus may implement the roll coating step (306) as direct roll coating. In the direct roll coating embodiment, the first roller (120) may contact the upper surface (106) and the third roller (202) may contact the first roller (12) to apply the functionalization solution thereto. Also, in the direct roll coating embodiment of FIG. 2B, the first roller may meter the functionalization solution onto the upper surface (106) as the aluminum alloy sheet product (103) progresses through the roll coating apparatus (118). Also, in the direct roll coating embodiment, the rotational direction of the first roller (120) may be complimentary with the direction at which the aluminum alloy sheet product (103) moves with respect to the roll coating apparatus (118). Likewise, the rotational direction of the second roller (122) which may contact the lower surface (108) may be complimentary with the direction of movement of the aluminum alloy sheet product (103). However, in the direct roll coat embodiment, an additional roller does not also contact the second roller (122) as the third roller (202) does with the first roller (120) contacting the upper surface (106). In cases where the lower surface (108) is to be roll coated using the direct roll coating embodiment, the setup may be generally the same as described above with reference to the upper surface (106), except that the first roller (120) is replaced with the second roller (122) which may contact the lower surface (108), and where the third roller (202) may contact the second roller (122).

In yet another embodiment, shown in FIG. 2C, the roll coating apparatus may implement the roll coating step (306) as reverse roll coating. In the reverse roll coating embodiment, the first roller (120) may contact the upper surface (106) and the third roller (202) may contact the first roller (12) to apply the functionalization solution thereto. Also, in the reverse roll coating embodiment of FIG. 2C, the first roller may meter the functionalization solution onto the upper surface (106) as the aluminum alloy sheet product (103) progresses through the roll coating apparatus (118). Also, in the reverse roll coating embodiment, the rotational direction of the first roller (120) may be opposite to the direction at which the aluminum alloy sheet product (103) moves with respect to the roll coating apparatus (118). However, in the reverse roll coating embodiment, the rotational direction of the second roller (122) which may contact the lower surface (108) may be complimentary with the direction of movement of the aluminum alloy sheet product (103). Also, in the reverse roll coat embodiment, an additional roller does not also contact the second roller (122) as the third roller (202) does with the first roller (120) contacting the upper surface (106). In cases where the lower surface (108) is to be roll coated using the reverse roll coating embodiment, the setup may be generally the same as described above with reference to the upper surface (106), except that the first roller (120) is replaced with the second roller (122) which may contact the lower surface (108), and where the third roller (202) may contact the second roller (122). Also, in any of the roll coating apparatus (118) embodiments shown in FIGS. 1 and 2A-2C, the first (120), second (122), third (202) and/or any additional rollers used in the roll coating step (306) may be either smooth or engraved (e.g., gravure), as appropriate.

The method (300) may also include a drying step (308). The drying may be completed via convective, conductive, and/or radiative processes. In one embodiment, the drying step (308) may be performed after the roll coating step (306) is completed. As shown in FIG. 1, the drying step (308) may be performed using a dryer (128). In one embodiment, the dryer (128) includes a blower (not shown in FIG. 1) which may force (e.g., blow) heated air over the upper (106) and/or lower (108) surfaces for a predetermined amount of time. A temperature of the heated air is controlled to a predetermined temperature or to a predetermined range of temperatures. The predetermined amount of time for which a given portion of the roll coated aluminum alloy sheet product (103) is subjected to the drying step (308) may be dependent on the rate at which the roll coated product proceeds through the process (100). In another embodiment, the dryer (128) may include an oven (not shown in FIG. 1). Rather than blowing heated air onto the upper (106) and/or lower (106) surfaces, the oven may provide a heated and at least partially enclosed chamber to subject the roll coated aluminum alloy sheet product (103) to an environment maintained at a controlled predetermined temperature that is generally greater than a temperature of an exterior environment of the oven. As may be appreciated, the exposure time and/or temperature for either the blowing- or oven-based drying step (308) may be dependent on the alloy type and temper.

The drying step (308) may also be performed on one or both of the upper (106) and lower (108) surfaces of the roll coated aluminum alloy sheet product (103). Where only one of the upper (106) and lower (106) surfaces were roll coated, only the roll coated surface may need to be subjected to the drying step (308). However, where both the upper (106) and lower (108) surfaces were roll coated, both of those surfaces may need to be subjected to the drying step (308).

As shown in FIG. 7, a method (700) may include maintaining the aluminum alloy sheet product (103) at a predetermined peak metal temperature. In one embodiment, the aluminum alloy sheet product (103) is maintained at the peak metal temperature in a controlled manner (e.g., due to the drying apparatus used and/or the feed rate of the product). In one embodiment, the peak metal temperature is maintained at a temperature of at least 150° F. In another embodiment, the peak metal temperature is maintained at a temperature of at least 180° F. In yet another embodiment, the peak metal temperature is maintained at a temperature of at least 210° F. In still another embodiment, the peak metal temperature is maintained at a temperature of at least 240°

F. In another embodiment, the peak metal temperature is maintained at a temperature of at least 270° F. In yet another embodiment, the peak metal temperature is maintained at a temperature of not greater than 300° F.

The method (700) may also include maintaining the aluminum alloy sheet product (103) at a peak metal temperature within a predetermined range of temperature values. In one embodiment, the peak metal temperature of the aluminum alloy sheet product (103) is maintained in a controlled manner to be from 150° F. to 300° F. In another embodiment, the peak metal temperature of the aluminum alloy sheet product (103) is maintained in a controlled manner to be from 200° F. to 270° F. Where methods (300) and/or (700) are implemented in the process (100), for example, the drying step (308) may present the highest temperature exposure condition(s) for the aluminum alloy sheet product (103). Thus, in methods (300) and (700), the drying step (308) may include an appropriate control scheme for controlling the peak metal temperature of the roll coated aluminum alloy sheet product (103) to be maintained at the desired predetermined temperature value or within the desired predetermined range of temperature values.

In method (300) and/or method (700), the drying step (308) may be performed in the absence of rinsing the roll coated aluminum alloy sheet product (103) after the roll coating step (306). Performing the drying step (308) in the absence of any additional rinsing step(s) is advantageous for reasons including, for example and without limitation, time, labor, and material costs savings, reduction of waste outflows, and a reduction in a number of required unit operations for preparing the aluminum alloy sheet product (103) for subsequent adhesive bonding. Also, the method (300) implemented, for example, in the process (100) may include a recoiling step (130). The recoiling step (130) may be performed after the drying step (308). The recoiling step (130) may include rolling the roll coated and dried aluminum alloy sheet product (103) into a coil (104) that is generally of the same form as the coil (104) into which the as-received aluminum alloy sheet product was initially rolled.

I. Creating the Functional Layer

A functional layer may be created on the prepared aluminum alloy sheet product (103) during the roll coating (306) and/or drying (308) steps. To create a functionalized layer during the rolling coating (306) and/or drying (308) steps, the prepared aluminum alloy sheet product (103) is generally exposed to an appropriate chemical, such as an acid or a base. In the method (500), for instance, the functionalization solution applied to the upper (106) and/or lower (108) surface as described above may be a phosphorous-containing organic acid. In one embodiment, the roll coating step (306) may include contacting the upper (106) and/or lower (108) surfaces of the prepared aluminum alloy sheet product with any of the phosphorus-containing organic acids disclosed in U.S. Pat. No. 6,167,609, referenced above. A layer of polymeric adhesive may then be applied to the functionalized layer (e.g., for joining to a metal support structure to form a vehicle assembly).

For the aluminum alloy sheet products (103), the phosphorus-containing organic acid generally interacts with the surface oxide layer to form the functionalized layer. The phosphorus-containing organic acid may be an organophosphonic acid or an organophosphinic acid. The organic acid is dissolved in water, methanol, or other suitable organic solvent, to form a solution that is applied to the prepared aluminum alloy sheet product (103) during the roll coating step (306). As described above, in one embodiment, the drying step (308) may be performed after the roll coating step (306) in the absence of any additional rinsing step(s). In other embodiments, the roll coated aluminum alloy sheet product (103) is rinsed with water (e.g., deionized water) after the functionalization solution is applied.

The term "organophosphonic acid" includes acids having the formula $R_m[PO(OH)_2]_n$, wherein R is an organic group containing 1-30 carbon atoms, m is the number of organic groups and is 1-10, and n is the number of phosphonic acid groups and is 1-10. Some suitable organophosphonic acids include vinylphosphonic acid, methylphosphonic acid, ethylphosphonic acid, octylphosphonic acid and styrenephosphonic acid.

The term "organophosphinic acid" includes acids having the formula $R_mR'_o[PO(OH)]_n$, wherein R is an organic group containing 1-30 carbon atoms, R' is hydrogen or an organic group containing 1-30 carbon atoms, m is the number of R groups and is 1-10, n is the number of phosphinic acid groups and is 1-10, and o is the number of R' groups and is 1-10. Some suitable organophosphinic acids include phenylphosphinic acid and bis-(perfluoroheptyl)phosphinic acid.

An advantage of these phosphorus-containing organic acids is that the pretreatment solution contains less than about 1 wt. % chromium and preferably essentially no chromium. Accordingly, environmental concerns associated with chromate conversion coatings are eliminated.

After completion of the roll coating (306) and drying (308) steps, the roll coated, and thus functionalized, aluminum alloy sheet product (103) may then be cut in desired sizes and shapes and/or worked into a predetermined configuration. Shaped assemblies made in accordance with the invention are suitable for many components of vehicles, including automotive bodies, body-in-white components, doors, trunk decks and hood lids.

The functionalized aluminum alloy sheet products (103) may be bonded to a metal support structure using a polymeric adhesive. Thus, method (300) may include joining portion(s) of the roll coated and dried aluminum alloy sheet product (103) to another material via the bonding agent.

Methods (300), (400), (500), (600) and/or (700) may be implemented in a mass production process. In manufacturing automotive components, for example, it is often necessary to join the functionalized aluminum alloy sheet material to an adjacent structural member. Joining functionalized aluminum alloy materials may be accomplished in two steps. First, a polymeric adhesive layer may be applied to the functionalized aluminum alloy sheet product, after which it is pressed against or into another component (e.g., another functionalized aluminum alloy sheet product (103) (e.g., formed of a 5xxx, 6xxx, or 7xxx aluminum alloy); a steel product; a carbon reinforced composite). The polymeric adhesive may be an epoxy, a polyurethane or an acrylic. The roll coating may also be useful in the production of can sheet stock (e.g., for beverage containers).

After the adhesive is applied, the components may be spot welded or mechanically fastened together, e.g., in a joint area of applied adhesive. Spot welding or mechanical fastening may increase peel strength of the assembly and may facilitate handling during the time interval before the adhesive is completely cured. If desired, curing of the adhesive may be accelerated by heating the assembly to an elevated temperature. The assembly may then be passed through a paint preparation bath, dried, electrocoated, and subsequently painted with an appropriate finish, such as any of a 1xxx, 2xxx, 3xxx, 4xxx or 8xxx-type aluminum alloy.

II. 5xxx, 6xxx, and 7xxx Aluminum Alloys

The roll coating-based technology described herein may be used with any suitable aluminum alloy sheet products, including sheet products formed from the 5xxx, 6xxx, and 7xxx aluminum alloy products.

While the disclosure has been described in relation to preparing 5xxx, 6xxx and/or 7xxx aluminum alloy products for adhesive bonding, it is anticipated that the roll coating-based techniques described herein may also be applicable to other aluminum alloys having the ability to be adhesive bonded to other materials.

DETAILED DESCRIPTION

Example 1

Figure 1:
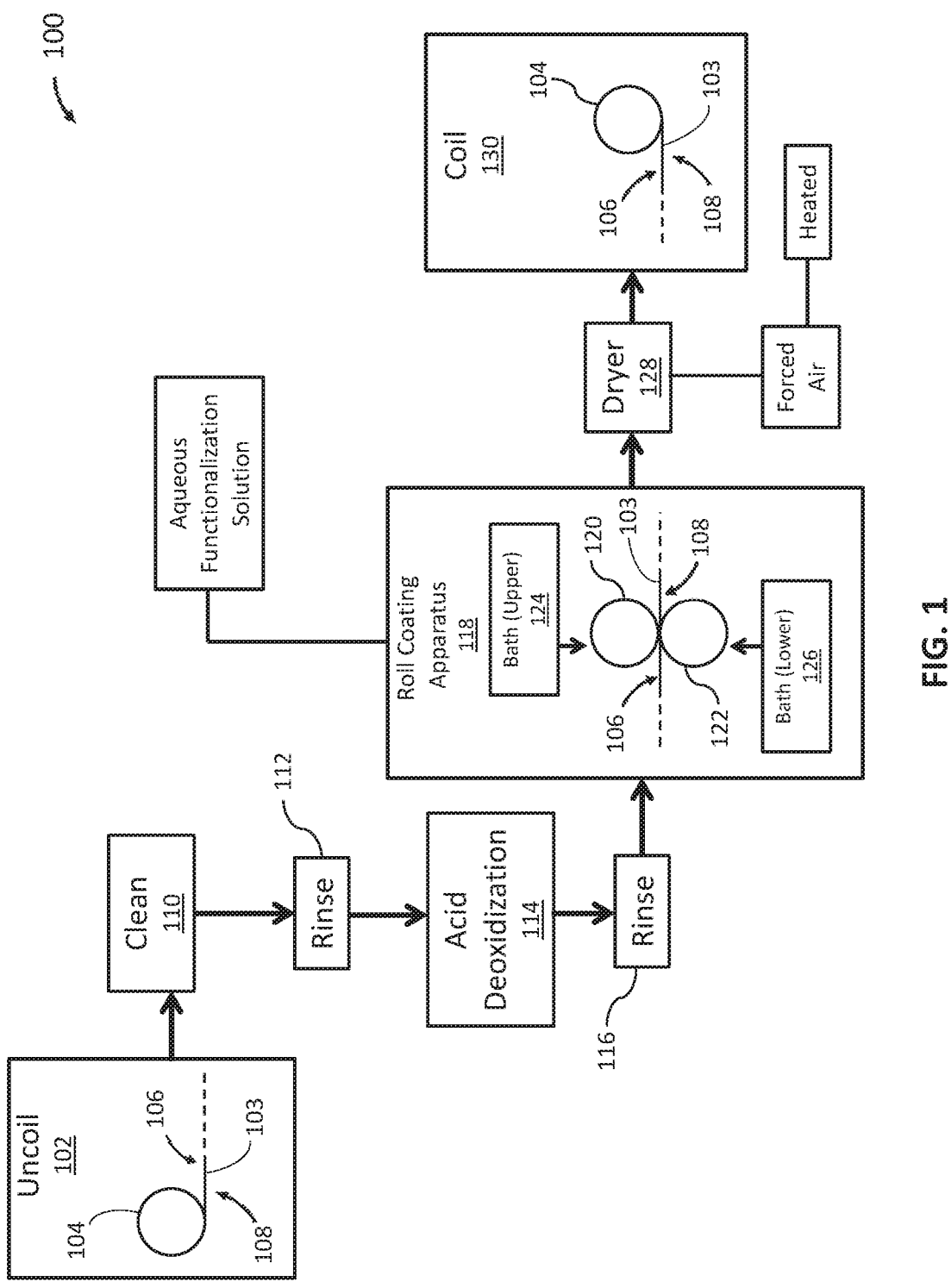
FIG. 1 is a block diagram of a roll coating-based process for preparing an aluminum alloy sheet product for adhesive bonding.

Several aluminum alloy sheet products were produced from both 6xxx (e.g., 6111) and 5xxx (e.g., 5754) alloys. The 6111 aluminum alloy sheets were processed to a T4 temper and the 5754 aluminum alloy sheets were processed to an O temper. For each of the 6111-T4 and 5754-O sheets, 8 sheet specimens were subject to a batch process. The sheet specimens were alkaline cleaned by spraying with an alkaline solution (4 wt. % of an alkaline carbonate cleaner) to remove residual lubricants and general contamination. The alkaline solution was maintained at 140° F. and the sheet specimens were allowed to contact the alkaline solution for 4 seconds. After the alkaline cleaning, the sheet specimens were rinsed with deionized water after the alkaline cleaning was performed.

After the alkaline cleaning step, the sheet specimens were deoxidized by spraying them with an acidic solution (nitric acid at 4 wt. %). The acidic solution was maintained at 120° F. and the sheet specimens were allowed to contact the acidic solution for 4 seconds. After the acid deoxidization step, the sheet specimens were rinsed with deionized water. Also, all sheet specimens were verified after the post-acid deoxidization rinse for water break-free behavior by visual inspection.

Next, two sets of 4 specimens for each of the 6111-T4 and 5754-O sheets were contacted with an aqueous functionalization solution in the form of a phosphorus-containing organic acid (PCOA) solution maintained at 90° F. The PCOA included a solution mixture of active ingredients including a first monomer component (component "A") and a second polymer component ("B"). For Example 1, component A was a polymer, as per U.S. Pat. No. 6,167,609, and component B was a copolymer, as per U.S. Pat. No. 6,020, 030. The amount of component A exceeded the amount of component B in the solution. For the first set, the sheet specimens were immersed in the PCOA for 10 seconds, followed by rinsing with deionized water and air drying. For the second set, the PCOA was applied to the sheet specimens using a drawdown bar to simulate roll coating application. Rather than rinsing the second set sheet specimens as for the first set, the second set specimens proceeded directly to a heated drying step after the PCOA was applied. The drying of the second set sheet specimens was performed at a peak metal temperature of 350° F. For both the first and second sets, the sheet specimens were then sequentially bonded and then subjected to bond durability testing (BDT) according to an automotive industry standard cyclical corrosion exposure test. This bond durability testing included a combination of applied lap sheer stress and environmental exposure (the "BDT test"). The BDT results of the specimens of the Example 1 aluminum alloy sheets are provided in Table 1, below.

TABLE 1

| | | | | | | | | |
|---|---|---|---|---|---|---|---|---|
| BDT Test Results | | | | | | | | |
| | Number of BDT Cycles Survived | | | | | | | |
| PCOA Application | 6111-T4 Specimen No. | | | | 5754-O Specimen No. | | | |
| Method | 1 | 2 | 3 | 4 | 1 | 2 | 3 | 4 |
| Immersion | 45 | 45 | 45 | 45 | 45 | 45 | 45 | 45 |
| Drawdown Bar | 0 | 0 | 0 | 0 | 1 | 1 | 1 | 1 |

In Table 1, above, a specimen having survived 45 BDT cycles represents a passing BDT test result. For both the 6111-T4 and 5754-O sheets of Example 1, all specimens achieved passing BDT test results. With the PCOA having A:B=3:1 applied using the drawdown bar, however, no specimens of the 5754-O sheets survived greater than 1 BDT cycle, while for the 6111-T4 sheets, all specimens failed after initial stress was applied to the rings and prior to commencing the environment exposure portion of the BDT test.

Example 2

Based on the Example 1 results, several aluminum alloy sheet products were produced from both 6xxx (e.g., 6022, 6111) and 5xxx (e.g., 5754) alloys. All 6xxx aluminum alloys were processed to a T4 temper and all 5xxx aluminum alloys were processed to an O temper. Using a batch process, sheet specimens were alkaline cleaned with an alkaline solution (a buffered alkaline solution) to remove residual lubricants and general contamination. The sheet specimens were immersed for 2 minutes in the alkaline solution maintained at 140° F. The sheet specimens were then rinsed with deionized water after the alkaline cleaning was performed.

The sheet specimens were then deoxidized with an acidic solution (BONDERITE® C-IC 243 at 14% by volume). The sheet specimens were immersed for 20 seconds in the acidic solution maintained at 170° F. All specimens were rinsed with deionized water after the acid deoxidization was performed. Also, all sheet specimens were verified after the post-acid deoxidization rinse for water break-free behavior by visual inspection.

Following the verification of water break-free behavior, an aqueous functionalization solution in the form of a phosphorus-containing organic acid (PCOA) was applied by pipetting onto the surfaces of the aluminum alloy sheet specimens. Next, roll coating was performed by passing the specimens, with the PCOA applied to them, through squeegee rolls to meter the PCOA over the surfaces of the specimens. The PCOA included a solution mixture of active ingredients including a first monomer component (component "A") and a second polymer component ("B"). Component A and B were the same compounds as per Example 1. Various roll coat conditions were used, as shown in Tables 2A-2C, below.

Instead of rinsing the aluminum alloy sheet specimens after the roll coating step, the sheet specimens proceeded directly to drying, where the specimens were subjected to various heated forced air drying conditions with the peak metal temperatures (PMT) being maintained at from 150 to 270° F., as shown in Tables 2A-2C, below. Initial X-ray fluorescence (XRF) analysis for phosphorus coating weight was performed following completion of drying. After the initial XRF analysis, a hot deionized water rinse was completed followed by re-measurement of phosphorus coating weight by XRF to assess adhesion of the treatment. The sheet specimens were then sequentially bonded and then subjected to bond durability testing (BDT) according to an automotive industry standard cyclical corrosion exposure test.

The results of the XRF testing of specimens of 6022-T4 (1), 6111-T4, 6022-T4(2), and 5754-O aluminum alloy sheets from Example 2 are provided in Tables 2A-2C, below. As used herein, "T4(1)" refers to a first 6022 sheet in the T4 temper and "T4(2)" refers to a second 6022 sheet in the T4 temper. In Tables 2A-2C, below, each XRF test result represents the average of four replicate test results of four specimens per sheet. Also, in Tables 2A-2C, below, sheets having a post-drying coat weight of from 0.21 to 3.55 mg/m² P are deemed passing ("P") results. If an initial XRF result for post-drying phosphorus coating weight was not within the 0.21-3.55 mg/m² P range, that sheet was deemed a failing ("F") result. Results from re-measurement of phosphorus coating weight by XRF after the post-drying hot deionized water rinse are classified into three categories in Tables 2A-2C: (1) a reduction in phosphorus coating weight of less than 10%; (2) a reduction in phosphorus coating weight of 10-15%; and (3) a greater than 15% reduction in phosphorus coating weight. The BDT results of the specimens of the Example 2 aluminum alloy sheets are provided in Tables 3A-3C, below.

TABLE 2A

| | | | | | | | | | |
|---|---|---|---|---|---|---|---|---|---|
| XRF Test Results for 150° F. PMT | | | | | | | | | |
| | | 6022-T4(1) | | 6111-T4 | | 6022-T4(2) | | 5754-O | |
| Concentration (A + B, wt. %) | Concentration Ratio (A:B) | Initial XRF (Pass or Fail) | Post-Hot Water Rinse XRF (% Loss of P) | Initial XRF (Pass or Fail) | Post-Hot Water Rinse XRF (% Loss of P) | Initial XRF (Pass or Fail) | Post-Hot Water Rinse XRF (% Loss of P) | Initial XRF (Pass or Fail) | Post-Hot Water Rinse XRF (% Loss of P) |
| 1 | 5:95 | P | >15 | P | <10 | P | 10-15 | P | <10 |
| 1 | 35:65 | P | >15 | P | >15 | F | >15 | P | 10-15 |
| 2.5 | 5:95 | P | 10-15 | P | >15 | P | 10-15 | P | >15 |
| 2.5 | 35:65 | F | >15 | P | >15 | P | <10 | P | >15 |

TABLE 2B

| | | XRF Test Results for 180° F. PMT | | | | | | | |
| | | 6022-T4(1) | | 6111-T4 | | 6022-T4(2) | | 5754-O | |
| Concen-tration (A + B, wt. %) | Concen-tration Ratio (A:B) | Initial XRF (Pass or Fail) | Post-Hot Water Rinse XRF (% Loss of P) | Initial XRF (Pass or Fail) | Post-Hot Water Rinse XRF (% Loss of P) | Initial XRF (Pass or Fail) | Post-Hot Water Rinse XRF (% Loss of P) | Initial XRF (Pass or Fail) | Post-Hot Water Rinse XRF (% Loss of P) |
|---|---|---|---|---|---|---|---|---|---|
| 1 | 5:95 | P | >15 | P | <10 | P | 10-15 | P | 10-15 |
| 1 | 35:65 | P | >15 | P | >15 | P | >15 | F | >15 |
| 2.5 | 5:95 | P | 10-15 | P | >15 | P | >15 | P | >15 |
| 2.5 | 35:65 | F | >15 | P | >15 | P | >15 | P | >15 |

15

TABLE 2C

| | | XRF Test Results for 210° F. PMT | | | | | | | |
| | | 6022-T4(1) | | 6111-T4 | | 6022-T4(2) | | 5754-O | |
| Concen-tration (A + B, wt. %) | Concen-tration Ratio (A:B) | Initial XRF (Pass or Fail) | Post-Hot Water Rinse XRF (% Loss of P) | Initial XRF (Pass or Fail) | Post-Hot Water Rinse XRF (% Loss of P) | Initial XRF (Pass or Fail) | Post-Hot Water Rinse XRF (% Loss of P) | Initial XRF (Pass or Fail) | Post-Hot Water Rinse XRF (% Loss of P) |
|---|---|---|---|---|---|---|---|---|---|
| 1 | 5:95 | P | >15 | P | 10-15 | P | <10 | P | >15 |
| 1 | 35:65 | P | >15 | P | >15 | P | 10-15 | P | >15 |
| 2.5 | 5:95 | P | >15 | P | 10-15 | P | 10-15 | P | <10 |
| 2.5 | 35:65 | P | >15 | F | >15 | P | >15 | P | >15 |

TABLE 3A

| | | BDT Test Results for 150° F. PMT | | | |
| Concentration (A + B, wt. %) | Concentration Ratio (A:B) | Number of Specimens Failing Prior to Completing 45 BDT Cycles | | | |
| | | 6022-T4(1) | 6111-T4 | 6022-T4(2) | 5754-O |
|---|---|---|---|---|---|
| 1 | 5:95 | ≥2 (28) | 0 | 1 (34) | 0 |
| 1 | 35:65 | 1 (34) | 0 | 1 (34) | 1 (37) |
| 2.5 | 5:95 | 1 (34) | 0 | 0 | 0 |
| 2.5 | 35:65 | ≥2 (2) | ≥2 (39) | 0 | 0 |

TABLE 3B

| | | BDT Test Results for 180° F. PMT | | | |
| Concentration (A + B, wt. %) | Concentration Ratio (A:B) | Number of Specimens Failing Prior to Completing 45 BDT Cycles | | | |
| | | 6022-T4(1) | 6111-T4 | 6022-T4(2) | 5754-O |
|---|---|---|---|---|---|
| 1 | 5:95 | 1 (34) | ≥2 (27) | 0 | 0 |
| 1 | 35:65 | 0 | 0 | 0 | 0 |
| 2.5 | 5:95 | 0 | 0 | 0 | 0 |
| 2.5 | 35:65 | ≥2 (23) | ≥2 (12) | 0 | 0 |

TABLE 3C

| | | BDT Test Results for 210° F. PMT | | | |
| Concentration | Concentration | Number of Specimens Failing Prior to Completing 45 BDT Cycles | | | |
| (A + B, wt. %) | Ratio (A:B) | 6022-T4(1) | 6111-T4 | 6022-T4(2) | 5754-O |
|---|---|---|---|---|---|
| 1 | 5:95 | 0 | 1 (34) | 0 | 1 (34) |
| 1 | 35:65 | 0 | ≥2 (2) | 0 | 0 |
| 2.5 | 5:95 | 0 | 1 (38) | 0 | 0 |
| 2.5 | 35:65 | 0 | ≥2 (11) | 0 | 0 |

In Tables 3A-3C, above, each BDT result represents the average of four replicate specimens per sheet. Also, in Tables 3A-3C, above, BDT results are classified into three categories: (1) all specimens achieving at least 45 cycles of BDT (e.g., no failing specimens); (2) one specimen not achieving 45 BDT cycles; and (3) 2 or more specimens not achieving 45 BDT cycles. In Tables 3A-3C, in cases where one or more tested specimens did not successfully attain 45 BDT cycles, the average number of cycles that the four tested specimens attained is shown in parentheses.

In Example 2, for the 6022-T4(1) and 6022-T4(2) sheets, all BDT tests achieved 45 cycles across all the (A+B) concentration and A:B ratios for the 210° F. PMT condition. Also, for the 6022-T4(1) sheets at the 210° F. PMT, and for all the (A+B) concentration and A:B ratios, all post-drying rinse XPF results show greater than 15% phosphorus loss. A similar effect was observed for the 6022-T4(2) sheets at the 180° F. PMT. Also, at the 180° F. PMT condition, all 6022-T4(1) sheet specimens achieved 45 BDT cycles for the (A+B) concentrations of 1 and 2.5, and the A:B ratio of 35:65. The worst BDT test performance was observed for the 6022-T4(1) sheets at the 150° F. PMT condition, for which there were no results achieving 45 BDT cycles. For 6022-T4(1), there were no results for any of the tested conditions where 45 BDT were achieved in combination with less than 10% loss of phosphorus after the post-drying rinse. For 6022-T4(2), on the other hand, 45 BDT cycles were achieved concomitantly with less than 10% post-drying rinse phosphorus coating weight reduction in two cases: (1) PMT=150° F., (A+B) concentration=2.5 wt. %, and A:B=35:65; and (2) PMT=210° F., (A+B) concentration=1 wt. %, and A:B=5:95. It thus appears that for 6022 aluminum alloy sheets, BDT performance depends more on PMT than it does on (A+B) concentration and/or A:B for the PCOA applied by roll coating, with higher PMTs promoting better bond durability.

For the 6111 sheets in Example 2, only one test result was obtained where 45 BDT cycles were achieved along with less than 10% loss of phosphorus after the post-drying rinse: PMT=150° F., (A+B) concentration=1 wt. %, and A:B=5:95. The 150° F. PMT condition also yielded the best overall BDT performance, where 45 BDT cycles were attained for all but the condition with (A+B) concentration=2.5 and A:B=35:65. At the 180° F. PMT condition, 45 BDT cycles were obtained for only 2 of 4 tests. The worst bonding performance was observed for the 210° F. PMT condition, where none of the tests attained 45 BDT cycles. Thus, in contrast to the trend observed for 6022, for 6111 aluminum alloy sheets, it appears that lower PMTs promote better bond durability.

For the 5754 sheets in Example 2, bonding performance appears to depend neither upon PMT, nor (A+B) concentration and/or A:B ratio conditions. For 5754, 45 BDT cycles were attained for all but two sets of conditions: (1) PMT=150° F., (A+B) concentration=1, and A:B=35:65 (result included 10-15% post-drying rinse loss in phosphorus coating weight); and (2) PMT=210° F., (A+B) concentration=1, and A:B=5:95 (result included greater than 15% post-drying loss in phosphorus coating weight). Similarly, little to no correlation was observed between post-drying rinse phosphorus coating weight loss and PMT, (A+B) concentration and/or A:B ratio.

Overall, the results obtained in Example 2 demonstrate that PMT, (A+B) concentration, and A:B ratio, and combinations thereof, appear to be important parameters for achieving desired bonding performance of the tested alloys after roll coating-based application of the PCOA. The observed effects appear to be dependent on the composition of the aluminum alloy sheet and, therefore, the conditions described above may be adjusted to achieve the desired bond durability after using roll coating-based preparation methods. This tailoring of conditions may include varying PMT, (A+B) concentration, and A:B ratio, and combinations thereof, between the upper and lower surfaces of the aluminum alloy sheet products.

Example 3

Based on the Example 2 results, several aluminum alloy sheet products were produced from both 6xxx (e.g., 6022) and 5xxx (e.g., 5754) alloys. All 6xxx aluminum alloys were processed to a T4 temper and all 5xxx aluminum alloys were processed to an O temper. Using a continuous, coil-to-coil process, the sheets were uncoiled and then alkaline cleaned with an alkaline solution (potassium hydroxide-based) to remove residual lubricants and general contamination. The upper and lower surfaces of the sheets were sprayed with the alkaline solution maintained at 140° F. and for a contact time of 4 seconds. The upper and lower sheet surfaces were then rinsed with deionized water after the alkaline cleaning was performed.

Upper and lower surfaces of the sheets were then deoxidized by spraying with an acidic solution and for a contact time of 4 seconds. Three different deoxidization conditions were used: (1) 4% by weight nitric acid maintained at 140° F.; (2) 14% by volume BONDERITE® C-IC 243 maintained at 170° F.; and (3) 4% by volume GARDOCLEAN® S5149 (formerly known as DC 7853) maintained at 130° F. and containing H7274 additive to provide 200 ppm free fluoride. The upper and lower sheet surfaces were rinsed with deionized water after the acid deoxidization was performed. Also, all sheets were verified after the post-acid deoxidization rinse for water break-free behavior by visual inspection.

Following the verification of water break-free behavior, an aqueous functionalization solution (the PCOA as described above for Example 2) was applied to both the upper and lower surfaces of the sheets by roll coating. For the roll coating step, the PCOA was applied with squeegee rolls using coating against tension for both the upper and lower sheet surfaces. Also, for Example 3 the aluminum alloy sheets were fed through the continuous coil-to-coil process at 122 feet per minute. The (A+B) concentration for the upper surface PCOA roll coating was maintained at 0.625 wt. % and the (A+B) concentration for the lower surface PCOA roll coating was maintained at 1.25 wt. %. In Example 3, a ratio of the concentration of A to the concentration of B (A:B) in the applied PCOA was set at either 5:95 and 35:65.

Instead of rinsing the aluminum alloy sheets after the roll coating step, the sheets proceeded directly to drying, where they were subjected to various heated forced air drying conditions with the PMTs being maintained at from 150 to 210° F., as shown in Tables 4A-4C, below. XRF analysis and BDT tests were performed as described above in reference to Example 2.

The results of the XRF testing of specimens of 6022-T4 (1) and 5754-O aluminum alloy sheets from Example 3 are provided in Tables 4A-4C, below. In Tables 4A-4C, below, each XRF test result represents the average of four replicate test results of four specimens per sheet. Also, in Tables 4A-4C, below, sheets having a post-drying coat weight of from 0.21 to 3.55 mg/m$^2$ P are deemed passing ("P") results. If an initial XRF result for post-drying phosphorus coating weight was not within the 0.21-3.55 mg/m$^2$ P range, that sheet was deemed a failing ("F") result. Results from re-measurement of phosphorus coating weight by XRF after the post-drying hot deionized water rinse are classified into three categories in Tables 4A-4C: (1) a reduction in phosphorus coating weight of less than 10%; (2) a reduction in phosphorus coating weight of 10-15%; and (3) a greater than 15% reduction in phosphorus coating weight. The BDT results of the 6022-T4(1) and 5754-O aluminum alloy sheets from Example 3 are provided in Tables 5A-5C, below.

TABLE 4A

| | | Upper Sheet Surface 0.625 wt. % (A+B) | | | | Lower Sheet Surface 1.25 wt. % (A+B) | | | |
|---|---|---|---|---|---|---|---|---|---|
| | | 5754-O | | 6022-T4(1) | | 5754-O | | 6022-T4(1) | |
| PMT (° F.) | Concentration Ratio (A:B) | Initial XRF (Pass or Fail) | Post-Hot Water Rinse XRF (% Loss of P) | Initial XRF (Pass or Fail) | Post-Hot Water Rinse XRF (% Loss of P) | Initial XRF (Pass or Fail) | Post-Hot Water Rinse XRF (% Loss of P) | Initial XRF (Pass or Fail) | Post-Hot Water Rinse XRF (% Loss of P) |
|---|---|---|---|---|---|---|---|---|---|
| 150 | 5:95 | P | <10 | P | >15 | P | <10 | P | <10 |
| | 35:65 | P | <10 | P | >15 | P | <10 | P | <10 |
| 180 | 5:95 | P | <10 | P | >15 | P | <10 | P | <10 |
| | 35:65 | P | <10 | P | >15 | P | <10 | P | <10 |
| 210 | 5:95 | P | <10 | P | >15 | P | <10 | P | <10 |
| | 35:65 | P | <10 | P | >15 | P | <10 | P | <10 |

XRF Test Results for BONDERITE ® C-IC 243 Deox

TABLE 4B

| | | Upper Sheet Surface 0.625 wt. % (A + B) | | | | Lower Sheet Surface 1.25 wt. % (A + B) | | | |
|---|---|---|---|---|---|---|---|---|---|
| | | 5754-O | | 6022-T4(1) | | 5754-O | | 6022-T4(1) | |
| PMT (° F.) | Concentration Ratio (A:B) | Initial XRF (Pass or Fail) | Post-Hot Water Rinse XRF (% Loss of P) | Initial XRF (Pass or Fail) | Post-Hot Water Rinse XRF (% Loss of P) | Initial XRF (Pass or Fail) | Post-Hot Water Rinse XRF (% Loss of P) | Initial XRF (Pass or Fail) | Post-Hot Water Rinse XRF (% Loss of P) |
|---|---|---|---|---|---|---|---|---|---|
| 150 | 5:95 | P | >15 | P | >15 | P | <10 | P | >15 |
| | 35:65 | P | <10 | P | >15 | P | >15 | P | >15 |
| 180 | 5:95 | P | >15 | P | >15 | P | >15 | P | >15 |
| | 35:65 | P | <10 | P | >15 | P | >15 | P | >15 |
| 210 | 5:95 | P | >15 | P | >15 | P | <10 | P | >15 |
| | 35:65 | P | <10 | F | <10 | P | >15 | F | <10 |

XRF Test Results for Nitric Acid Deox

TABLE 4C

| | | XRF Test Results for GARDOCLEAN ® S5149 Deox | | | | | | | |
| | | Upper Sheet Surface 0.625 wt. % (A + B) | | | | Lower Sheet Surface 1.25 wt. % (A + B) | | | |
| | | 5754-O | | 6022-T4(1) | | 5754-O | | 6022-T4(1) | |
| PMT (° F.) | Concen-tration Ratio (A:B) | Initial XRF (Pass or Fail) | Post-Hot Water Rinse XRF (% Loss of P) | Initial XRF (Pass or Fail) | Post-Hot Water Rinse XRF (% Loss of P) | Initial XRF (Pass or Fail) | Post-Hot Water Rinse XRF (% Loss of P) | Initial XRF (Pass or Fail) | Post-Hot Water Rinse XRF (% Loss of P) |
|---|---|---|---|---|---|---|---|---|---|
| 150 | 5:95 | P | >15 | P | >15 | P | >15 | P | >15 |
| | 35:65 | P | >15 | P | <10 | P | >15 | P | <10 |
| 180 | 5:95 | P | <10 | P | >15 | P | >15 | P | <10 |
| | 35:65 | P | >15 | P | <10 | P | >15 | P | <10 |
| 210 | 5:95 | P | <10 | P | >15 | P | >15 | P | <10 |
| | 35:65 | P | >15 | P | <10 | P | >15 | P | <10 |

TABLE 5A

| | BDT Test Results for BONDERITE ® C-IC 243 Deox | | |
| | | Number of Specimens Failing Prior to Completing 45 BDT Cycles | |
| PMT (° F.) | Concentration Ratio (A:B) | 5754-O | 6022-T4(1) |
|---|---|---|---|
| 150 | 5:95 | 1 (31) | 0 |
| | 35:65 | 0 | 0 |
| 180 | 5:95 | 0 | 1 (36) |
| | 35:65 | 0 | 1 (37) |
| 210 | 5:95 | 0 | 0 |
| | 35:65 | 0 | 0 |

TABLE 5B

| | BDT Test Results XRF for Nitric Acid Deox | | |
| | | Number of Specimens Failing Prior to Completing 45 BDT Cycles | |
| PMT (° F.) | Concentration Ratio (A:B) | 5754-O | 6022-T4(1) |
|---|---|---|---|
| 150 | 5:95 | 0 | 0 |
| | 35:65 | 0 | 0 |
| 180 | 5:95 | 0 | 1 (31) |
| | 35:65 | 0 | 0 |
| 210 | 5:95 | 0 | 0 |
| | 35:65 | 0 | 1 (40) |

TABLE 5C

| | BDT Test Results for GARDOCLEAN ® S5149 Deox | | |
| | | Number of Specimens Failing Prior to Completing 45 BDT Cycles | |
| PMT (° F.) | Concentration Ratio (A:B) | 5754-O | 6022-T4(1) |
|---|---|---|---|
| 150 | 5:95 | 0 | 0 |
| | 35:65 | 0 | 0 |
| 180 | 5:95 | 0 | 0 |
| | 35:65 | 0 | 0 |
| 210 | 5:95 | 0 | 0 |
| | 35:65 | 0 | 0 |

In Tables 5A-5C, above, each BDT result represents the average of four replicate specimens per sheet. Also, in Tables 5A-5C, above, BDT results are classified into three categories: (1) all specimens achieving at least 45 cycles of BDT (e.g., no failing specimens); (2) one specimen not achieving 45 BDT cycles; and (3) 2 or more specimens not achieving 45 BDT cycles. None of the BDT test results of Example 3 included more than 1 specimen failing prior to achieving 45 cycles. In Tables 5A-5C, in cases where one tested specimen did not successfully attain 45 BDT cycles, the average number of cycles that the four tested specimens attained is shown in parentheses.

In Example 3, for the 6022-T4(1) sheets deoxidized with GARDOCLEAN® S5149, despite observed variations in post-drying rinse phosphorus coating weight losses between upper and lower sheet surfaces, all BDT tests achieved 45 cycles across all the (A+B) concentrations and A:B ratios for all PMT conditions. Also, for the 6022-T4(1) sheets at all PMT conditions, use of BONDERITE® C-IC 243 deoxidizer yielded the best results for post-drying rinse phosphorus retention on the lower surface, with all results showing less than 10% loss. Lower surface phosphorus retention results were only nominally worse for GARDOCLEAN® S5149 as compared to BONDERITE® C-IC 243. Use of BONDERITE® C-IC 243, however, yielded the worst phosphorus retention for the upper surface, with nitric acid providing only marginally better results for this measure. For the 6022-T4(1) sheets of Example 3, overall BDT results were comparable between BONDERITE® C-IC 243 and nitric acid, despite the observation that nitric acid resulted in the worst lower surface phosphorus retention. With the tested BONDERITE® C-IC 243 and nitric acid deoxidizer formulations, overall BDT performance was only nominally worse as compared to 6022-T4(1) sheets deoxidized using GARDOCLEAN® S5149. A greater than 15% loss of phosphorus from the upper surface was observed after the post-drying rinse for deoxidization using BONDERITE® C-IC 243 for all tested conditions, while in all cases, less than 10% phosphorus was lost from the lower surface deoxidized with BONDERITE® C-IC 243. Using nitric acid for deoxidization of the 6022-T4(1) sheets led to greater than 15% loss of phosphorus from both the upper and lower surfaces in all but one case: PMT=210° F., (A+B) concentrations=0.625 and 1.25 wt. % for the lower and upper surfaces, respectively, and A:B=35:65 (less than 10% reduction in phosphorus observed for this case). It thus appears that for 6022 aluminum alloy sheets, BDT performance may be more dependent on the formulation used for the deoxidization step than it is on the A:B ration of the PCOA applied by roll coating, but the A:B condition may be correlated with variations in observed phosphorus coating weight retention between the lower and upper surfaces.

Also, in Example 3, use of GARDOCLEAN® S5149 and nitric acid for deoxidizing the 5754 sheets yielded the best BDT results overall, with all tests attaining 45 cycles across all conditions, despite observed variations in upper and lower surface phosphorus losses. BONDERITE® C-IC 243, on the other hand, provided the best post-drying rinse phosphorus retention results for the 5754 sheets. Deoxidization of the 5754 sheets using GARDOCLEAN® S5149 yielded the worst results for phosphorus retention for both the upper and lower surfaces, but only nominally so for the upper surface as compared to use of nitric acid. Therefore, it appears that for 5754 aluminum alloy sheets, overall bonding performance is not greatly correlated with either PMT or the formulation used for the acid deoxidization step. However, there does appear to be some dependency between post-drying step phosphorus retention results and deoxidizer formulation used. It appears that PMT and/or A:B ratio may be correlated with observed differences in phosphorus retention on the lower surface as compared to the upper surface for 5754 sheets.

Overall, the results obtained in Example 3 demonstrate that PMT and A:B ratio, and combinations thereof, appear to be important parameters for achieving desired bonding performance of the tested alloys after roll coating-based application of the PCOA. The observed effects appear to be dependent on the composition of the aluminum alloy sheet and, therefore, the conditions described above may be adjusted to achieve the desired bond durability after using roll coating-based preparation methods. This tailoring of conditions may include varying deoxidizer formulation, PMT, and A:B ratio, and combinations thereof, between the upper and lower surfaces of the aluminum alloy sheet products.

Example 4

Aluminum alloy sheets were subjected to the procedure and conditions of Example 3, except that in Example 4, a PMT of 240° F. replaced the 150° F. PMT, and an A:B condition of 10:90 replaced the 5:95 A:B. Also, in Example 4, BONDERITE® C-IC 243 and GARDOCLEAN® S5149, but not nitric acid, were used for the acid deoxidization step. For Example 4, the aluminum alloy sheets, the (A+B) concentration of the PCOA was either maintained at the same concentration for the upper and lower surfaces, or the (A+B) concentration was less for the upper surface as compared to the lower surface (see Table 6B, below). XRF analysis and BDT tests were performed as described above in reference to Example 2.

The results of the XRF testing of 6022-T4(1) and 5754-O aluminum alloy sheets from Example 4 are provided in Tables 6A and 6B, below. In Tables 6A and 6B, below, each XRF test result represents the average of four replicate test results of four specimens per sheet. Also, in Tables 6A and 6B, below, sheets having a post-drying coat weight of from 0.21 to 3.55 mg/m$^2$ P are deemed passing ("P") results. If an initial XRF result for post-drying phosphorus coating weight was not within 0.21-3.55 mg/m$^2$ P, that sheet was deemed a failing ("F") result (no failing initial XRF results observed for Example 4). Results from re-measurement of phosphorus coating weight by XRF after the post-drying hot deionized water rinse are classified into three categories in Tables 6A and 6B: (1) a reduction in phosphorus coating weight of less than 10%; (2) a reduction in phosphorus coating weight of 10-15%; and (3) a greater than 15% reduction in phosphorus coating weight. Also, in Tables 6A and 6B, below, a sheet for which XRF testing was not performed is indicated by double dashes ("--"). The BDT results of the 6022-T4(1) and 5754-O aluminum alloy sheets from Example 4 are provided in Tables 7A and 7B, below.

TABLE 6A

XRF Test Results for BONDERITE ® C-IC 243 Deox

| | | | Upper Sheet Surface | | | | Lower Sheet Surface | | | |
| | | | 5754-O | | 6022-T4(1) | | 5754-O | | 6022-T4(1) | |
| PMT (° F.) | Concentration (A + B, wt. %) (For Both Upper & Lower Surfaces, Unless Otherwise Specified) | Concentration Ratio (A:B) (For Both Upper & Lower Surfaces, Unless Otherwise Specified) | Initial XRF (Pass or Fail) | Post-Hot Water Rinse XRF (% Loss of P) | Initial XRF (Pass or Fail) | Post-Hot Water Rinse XRF (% Loss of P) | Initial XRF (Pass or Fail) | Post-Hot Water Rinse XRF (% Loss of P) | Initial XRF (Pass or Fail) | Post-Hot Water Rinse XRF (% Loss of P) |
|---|---|---|---|---|---|---|---|---|---|---|
| 180 | 0.625 | 10:90 | P | <10 | P | >15 | P | <10 | P | <10 |
| | 0.625 | 35:65 | P | >15 | P | >15 | P | >15 | P | >15 |
| 210 | 0.625 | 10:90 | P | <10 | P | >15 | P | <10 | P | <10 |
| | 0.625 | 35:65 | P | >15 | P | >15 | P | >15 | P | >15 |
| 240 | 0.625 | 10:90 | P | <10 | P | >15 | P | <10 | P | <10 |
| | 0.625 | 35:65 | P | >15 | P | >15 | P | >15 | P | >15 |

TABLE 6B

XRF Test Results for GARDOCLEAN ® S5149 Deox

| | | | Upper Sheet Surface | | | | Lower Sheet Surface | | | |
| | | | 5754-O | | 6022-T4(1) | | 5754-O | | 6022-T4(1) | |
| PMT (° F.) | Concentration (A + B, wt. %) (For Both Upper & Lower Surfaces, Unless Otherwise Specified) | Concentration Ratio (A:B) (For Both Upper & Lower Surfaces, Unless Otherwise Specified) | Initial XRF (Pass or Fail) | Post-Hot Water Rinse XRF (% Loss of P) | Initial XRF (Pass or Fail) | Post-Hot Water Rinse XRF (% Loss of P) | Initial XRF (Pass or Fail) | Post-Hot Water Rinse XRF (% Loss of P) | Initial XRF (Pass or Fail) | Post-Hot Water Rinse XRF (% Loss of P) |
|---|---|---|---|---|---|---|---|---|---|---|
| 180 | 0.625 | 10:90 | P | >15 | P | >15 | P | <10 | P | <10 |
| | 0.625 | 35:65 | P | >15 | P | <10 | P | >15 | P | <10 |

No

TABLE 6B-continued

XRF Test Results for GARDOCLEAN ® S5149 Deox

| PMT (° F.) | Concentration (A + B, wt. %) (For Both Upper & Lower Surfaces, Unless Otherwise Specified) | Concentration Ratio (A:B) (For Both Upper & Lower Surfaces, Unless Otherwise Specified) | Upper Sheet Surface 5754-O Initial XRF (Pass or Fail) | Upper Sheet Surface 5754-O Post-Hot Water Rinse XRF (% Loss of P) | Upper Sheet Surface 6022-T4(1) Initial XRF (Pass or Fail) | Upper Sheet Surface 6022-T4(1) Post-Hot Water Rinse XRF (% Loss of P) | Lower Sheet Surface 5754-O Initial XRF (Pass or Fail) | Lower Sheet Surface 5754-O Post-Hot Water Rinse XRF (% Loss of P) | Lower Sheet Surface 6022-T4(1) Initial XRF (Pass or Fail) | Lower Sheet Surface 6022-T4(1) Post-Hot Water Rinse XRF (% Loss of P) |
|---|---|---|---|---|---|---|---|---|---|---|
| 210 | 0.625 | 10:90 | P | >15 | P | >15 | P | <10 | P | <10 |
|  | 0.625 | 35:65 | P | >15 | P | >15 | P | >15 | P | <10 |
|  | 0.625 (upper) 1.25 (lower) | 10:90 | — | — | P | <10 | — | — | P | <10 |
| 240 | 0.625 | 10:90 | — | — | P | >15 | — | — | P | <10 |
|  | 0.625 | 35:65 | P | >15 | P | >15 | P | >15 | P | <10 |
|  | 0.625 (upper) 1.25 (lower) | 10:90 | — | — | P | <10 | — | — | P | <10 |
|  | 1.25 | 10:90 | — | — | — | >15 | — | — | — | <10 |
|  | 1.25 | 35:65 (upper) 10:90 (lower) | — | — | P | >15 | — | — | P | <10 |

TABLE 7A

BDT Test Results for BONDERITE ® C-IC 243 Deox

| PMT (° F.) | Concentration (A + B, wt. %) (For Both Upper & Lower Surfaces, Unless Otherwise Specified) | Concentration Ratio (A:B) (For Both Upper & Lower Surfaces, Unless Otherwise Specified) | Number of Specimens Failing Prior to Completing 45 BDT Cycles 5754-O | 6022-T4(1) |
|---|---|---|---|---|
| 180 | 0.625 | 10:90 | 0 | 0 |
|  | 0.625 | 35:65 | 0 | 0 |
| 210 | 0.625 | 10:90 | 0 | 0 |
|  | 0.625 | 35:65 | 0 | 0 |
| 240 | 0.625 | 10:90 | 0 | 1 (41) |
|  | 0.625 | 35:65 | 0 | 0 |

TABLE 7B

BDT Test Results for GARDOCLEAN ® S5149 Deox

| PMT (° F.) | Concentration (A + B, wt. %) (For Both Upper & Lower Surfaces, Unless Otherwise Specified) | Concentration Ratio (A:B) (For Both Upper & Lower Surfaces, Unless Otherwise Specified) | Number of Specimens Failing Prior to Completing 45 BDT Cycles 5754-O | 6022-T4(1) |
|---|---|---|---|---|
| 180 | 0.625 | 10:90 | 1 (39) | 0 |
|  | 0.625 | 35:65 | 0 | 0 |
| 210 | 0.625 | 10:90 | 0 | 0 |
|  | 0.625 | 35:65 | 0 | 0 |
|  | 0.625 (upper) 1.25 (lower) | 10:90 | — | 0 |
| 240 | 0.625 | 10:90 | — | 0 |
|  | 0.625 | 35:65 | 0 | 0 |
|  | 0.625 (upper) 1.25 (lower) | 10:90 | — | 0 |
|  | 1.25 | 10:90 | — | 0 |
|  | 1.25 | 35:65 (upper) 10:90 (lower) | — | 0 |

In Tables 7A and 7B, above, each BDT result represents the average of four replicate specimens per sheet. Also, in Tables 7A and 7B, above, BDT results are classified into three categories: (1) all specimens achieving at least 45 cycles of BDT (e.g., no failing specimens); (2) one specimen not achieving 45 BDT cycles; and (3) 2 or more specimens not achieving 45 BDT cycles. None of the BDT test results of Example 4 included more than 1 bonding failure prior to achieving 45 cycles. In Tables 7A and 7B, in cases where one specimen did not successfully attain 45 BDT cycles, the average number of cycles that the four specimens attained is shown in parentheses. A sheet for which BDT testing was not performed is indicated by double dashes ("--") in Tables 7A and 7B, above.

In Example 4, for the 6022-T4(1) sheets deoxidized with BONDERITE® C-IC 243, all but one of the BDT test conditions (PMT=240° F., (A+B) concentrations=0.625 for both the lower and upper surfaces, and A:B=10:90) achieved 45 cycles. In that case, the specimens achieved an average of 41 BDT cycles. Also, for the 6022-T4(1) sheets deoxidized with BONDERITE® C-IC 243, the 3 specimens for the A:B=35:65 condition showed greater than 15% post-hot water rinse loss of phosphorus from their lower surfaces, and all the specimens lost greater than 15% of the phosphorus coating weight after that step for their upper surfaces. Also, in Example 4, for the 6022-T4(1) sheets deoxidized with GARDOCLEAN® S5149, all BDT test conditions provided 45 cycles. All the specimens for the 6022-T4(1) sheet deoxidized with GARDOCLEAN® S5149 showed less than 10% post-hot water rinse loss of phosphorus for their bottom surfaces, while all but 3 specimens lost greater than 15% of the phosphorus coating weight from their upper surfaces after that step.

For the 5754-O sheets of Example 4 deoxidized with BONDERITE® C-IC 243, all BDT test conditions provided 45 cycles. Also, for the 5754-O sheets deoxidized with BONDERITE® C-IC 243, the 3 specimens for the A:B=35: 65 condition showed greater than 15% post-hot water rinse loss of phosphorus from both their upper and lower surfaces. Also, in Example 4, for the 5754-O sheets deoxidized with GARDOCLEAN® S5149, all but one of the BDT test conditions (PMT=180° F., (A+B) concentrations=0.625 for both the lower and upper surfaces, and A:B=10:90) achieved 45 cycles. In that case, the specimens achieved an average of 39 BDT cycles. Also, for the 5754-O sheets deoxidized with GARDOCLEAN® S5149, the 3 specimens for the A:B=35:65 condition showed greater than 15% post-hot water rinse loss of phosphorus from their lower surfaces, and all the specimens lost greater than 15% of the phosphorus coating weight from their upper surfaces after that step.

The results of Example 4 suggest that, at least for the tested conditions, the deoxidizer formulation and the A:B ratio of the PCOA used in the corresponding steps for the 5754-O and 6022-T4(1) sheets may influence phosphorus retention results after the hot water rinse step. However, the effect of variations in these two process conditions on BDT results appears to be marginal. Overall, in Example 4, good performance was observed in the BDT testing with both the 6022-T4(1) and 5754-O sheets at all process conditions regardless of which of the two deoxidizer formulations were used.

Example 5

Aluminum alloy sheets were subjected to the procedure and conditions of Example 4, except that in Example 5, a PMT of 270° F. was used in addition to the 210° F. and 240° F. PMT conditions, and the 180° F. PMT condition was used for only one 5754 sheet at a single condition set for GARDOCLEAN® S5149 acid deoxidizer. Also, in Example 5, and an additional A:B condition of 25:75 was included for the PCOA. For the Example 5 the aluminum alloy sheets, the (A+B) concentration of the PCOA was either maintained at the same concentration for the upper and lower surfaces, or the (A+B) concentration was less for the upper surface as compared to the lower surface (see Tables 8A and 8B, below). XRF analysis and BDT tests were performed as described above in reference to Example 2.

The results of the XRF testing of 6022-T4(1) and 5754-O aluminum alloy sheets from Example 5 are provided in Tables 8A and 8B, below. In Tables 8A and 8B, below, each XRF test result represents the average of four replicate test results of four specimens per sheet. Also, in Tables 8A and 8B, below, sheets having a post-drying coat weight of from 0.21 to 3.55 mg/m$^2$ P are deemed passing ("P") results. If an initial XRF result for post-drying phosphorus coating weight was not within 0.21-3.55 mg/m$^2$ P, that sheet was deemed a failing ("F") result (no failing initial XRF results observed for Example 5). Results from re-measurement of phosphorus coating weight by XRF after the post-drying hot deionized water rinse are classified into three categories in Tables 8A and 8B: (1) a reduction in phosphorus coating weight of less than 10%; (2) a reduction in phosphorus coating weight of 10-15%; and (3) a greater than 15% reduction in phosphorus coating weight. Also, in Table 8A, below, a sheet for which XRF testing was not performed is indicated by double dashes ("--"). The BDT results of specimens of 6022-T4(1) and 5754-O aluminum alloy sheets from Example 5 are provided in Tables 9A and 9B, below.

TABLE 8A

| | | | | XRF Test Results for BONDERITE ® C-IC 243 Deox | | | | | |
| --- | --- | --- | --- | --- | --- | --- | --- | --- | --- |
| | | | Upper Sheet Surface | | | | Lower Sheet Surface | | |
| | Concentration | Concentration | 5754-O | | 6022-T4(1) | | 5754-O | | 6022-T4(1) | |
| PMT (° F.) | (A + B, wt. %) (For Both Upper & Lower Surfaces, Unless Otherwise Specified) | Ratio (A:B) (For Both Upper & Lower Surfaces, Unless Otherwise Specified) | Initial XRF (Pass or Fail) | Post-Hot Water Rinse XRF (% Loss of P) | Initial XRF (Pass or Fail) | Post-Hot Water Rinse XRF (% Loss of P) | Initial XRF (Pass or Fail) | Post-Hot Water Rinse XRF (% Loss of P) | Initial XRF (Pass or Fail) | Post-Hot Water Rinse XRF (% Loss of P) |
| | 0.625 (upper) 1.25 (lower) | 25:75 | P | <10 | — | — | P | <10 | — | — |

TABLE 8A-continued

XRF Test Results for BONDERITE ® C-IC 243 Deox

| | | | Upper Sheet Surface | | | | Lower Sheet Surface | | | |
|---|---|---|---|---|---|---|---|---|---|---|
| | Concentration | Concentration | 5754-O | | 6022-T4(1) | | 5754-O | | 6022-T4(1) | |
| PMT (° F.) | (A + B, wt. %) (For Both Upper & Lower Surfaces, Unless Otherwise Specified) | Ratio (A:B) (For Both Upper & Lower Surfaces, Unless Otherwise Specified) | Initial XRF (Pass or Fail) | Post-Hot Water Rinse XRF (% Loss of P) | Initial XRF (Pass or Fail) | Post-Hot Water Rinse XRF (% Loss of P) | Initial XRF (Pass or Fail) | Post-Hot Water Rinse XRF (% Loss of P) | Initial XRF (Pass or Fail) | Post-Hot Water Rinse XRF (% Loss of P) |
| 210 | 1.25 | 10:90 | P | <10 | P | <10 | P | <10 | P | <10 |
| | 0.625 (upper) 1.25 (lower) | 25:75 | P | <10 | P | <10 | P | <10 | P | <10 |
| 240 | 1.25 | 10:90 | P | <10 | P | <10 | P | <10 | P | <10 |
| | 0.625 (upper) 1.25 (lower) | 25:75 | P | <10 | P | <10 | P | <10 | P | <10 |
| 270 | 0.625 (upper) 1.25 (lower) | 25:75 | — | — | P | <10 | — | — | P | <10 |

25

TABLE 8B

XRF Test Results for GARDOCLEAN ® S5149 Deox

| | | | Upper Sheet Surface | | | | Lower Sheet Surface | | | |
|---|---|---|---|---|---|---|---|---|---|---|
| | Concentration | Concentration | 5754-O | | 6022-T4(1) | | 5754-O | | 6022-T4(1) | |
| PMT (° F.) | (A + B, wt. %) (For Both Upper & Lower Surfaces, Unless Otherwise Specified) | Ratio (A:B) (For Both Upper & Lower Surfaces, Unless Otherwise Specified) | Initial XRF (Pass or Fail) | Post-Hot Water Rinse XRF (% Loss of P) | Initial XRF (Pass or Fail) | Post-Hot Water Rinse XRF (% Loss of P) | Initial XRF (Pass or Fail) | Post-Hot Water Rinse XRF (% Loss of P) | Initial XRF (Pass or Fail) | Post-Hot Water Rinse XRF (% Loss of P) |
| 210 | 1.25 | 10:90 | P | >15 | P | >15 | P | >15 | P | >15 |
| | 0.625 (upper) 1.25 (lower) | 25:75 | P | <10 | P | >15 | P | >15 | P | >15 |
| 240 | 1.25 | 10:90 | P | >15 | P | >15 | P | >15 | P | >15 |
| | 0.625 (upper) 1.25 (lower) | 25:75 | P | <10 | P | >15 | P | >15 | P | >15 |
| 270 | 0.625 (upper) 1.25 (lower) | 25:75 | P | <10 | P | <10 | P | >15 | P | <10 |

TABLE 9A

BDT Test Results for BONDERITE ® C-IC 243 Deox

| | Concentration (A + B, wt. %) (For Both Upper & Lower Surfaces, Unless Otherwise Specified) | Concentration Ratio (A:B) (For Both Upper & Lower Surfaces, Unless Otherwise Specified) | Number of Specimens Failing Prior to Completing 45 BDT Cycles | |
|---|---|---|---|---|
| PMT (° F.) | | | 5754-O | 6022-T4(1) |
| 180 | 0.625 (upper) 1.25 (lower) | 25:75 | 0 | — |
| 210 | 1.25 | 10:90 | 0 | ≥2 (1) |
| | 0.625 (upper) 1.25 (lower) | 25:75 | 0 | 0 |

TABLE 9A-continued

| | BDT Test Results for BONDERITE ® C-IC 243 Deox | | | |
| | Concentration (A + B, wt. %) (For Both Upper & Lower Surfaces, Unless Otherwise | Concentration Ratio (A:B) (For Both Upper & Lower Surfaces, Unless Otherwise | Number of Specimens Failing Prior to Completing 45 BDT Cycles | |
| PMT (° F.) | Specified) | Specified) | 5754-O | 6022-T4(1) |
|---|---|---|---|---|
| 240 | 1.25 | 10:90 | 0 | ≥2 (1) |
| | 0.625 (upper) 1.25 (lower) | 25:75 | 0 | 0 |
| 270 | 0.625 (upper) 1.25 (lower) | 25:75 | — | 0 |

TABLE 9B

| | BDT Test Results for GARDOCLEAN ® S5149 Deox | | | |
| | Concentration (A + B, wt. %) (For Both Upper & Lower Surfaces, Unless | Concentration Ratio (A:B) (For Both Upper & Lower Surfaces, Unless | Number of Specimens Failing Prior to Completing 45 BDT Cycles | |
| PMT (° F.) | Otherwise Specified) | Otherwise Specified) | 5754-O | 6022-T4(1) |
|---|---|---|---|---|
| 210 | 1.25 | 10:90 | 0 | 1 (30) |
| | 0.625 (upper) 1.25 (lower) | 25:75 | 0 | 0 |
| 240 | 1.25 | 10:90 | 0 | 1 (30) |
| | 0.625 (upper) 1.25 (lower) | 25:75 | 0 | 0 |
| 270 | 0.625 (upper) 1.25 (lower) | 25:75 | 0 | 0 |

In Tables 9A and 9B, above, each BDT result represents the average of four replicate specimens per sheet. Also, in Tables 9A and 9B, above, BDT results are classified into three categories: (1) all specimens achieving at least 45 cycles of BDT (e.g., no failing specimens); (2) one specimen not achieving 45 BDT cycles; and (3) 2 or more specimens not achieving 45 BDT cycles). In Tables 9A and 9B, in cases where one or more tested specimens did not successfully attain 45 BDT cycles, the average number of cycles that the four tested specimens attained is shown in parentheses. A sheet for which BDT testing was not performed is indicated by double dashes ("--") in Table 9A, above.

In Example 5, for the 6022-T4(1) sheets deoxidized with BONDERITE® C-IC 243, all but two of the BDT test conditions (the 2 specimens associated with the A:B=10:90 condition at PMTs of 210 and 240° F.) achieved 45 cycles. In both of those cases, the specimens achieved an average of 1 BDT cycle. Also, for the 6022-T4(1) sheets deoxidized with BONDERITE® C-IC 243, all specimens showed less than 10% post-hot water rinse loss of phosphorus from both their upper and lower surfaces. For the 6022-T4(1) sheets deoxidized using GARDOCLEAN® S5149, the 2 specimens associated with the A:B=10:90 condition at PMTs of 210 and 240° F. did not achieve 45 cycles, but achieved far greater cycles prior to failure (30 cycles) as compared to the two corresponding 6022-T4(1) sheet specimens deoxidized with BONDERITE® C-IC 243 (1 cycle each). Also, for the GARDOCLEAN® S5149-deoxidized 6022-T4(1) sheets, all but one of the tested conditions (the specimen associated with the A:B=25:75 condition at PMT=270° F.) showed greater than 15% post-hot water rinse phosphorus loss from both the upper and lower surfaces.

For the 5754-O sheets deoxidized with BONDERITE® C-IC 243, all specimens achieved 45 BDT cycles over all conditions. Also, for the 5754-O sheets deoxidized with BONDERITE® C-IC 243, all specimens showed less than 10% post-hot water rinse loss of phosphorus from both their upper and lower surfaces. For the 5754-O sheets deoxidized using GARDOCLEAN® S5149, all specimens achieved 45 BDT cycles over all conditions. Also, for the GARDOCLEAN® S5149-deoxidized 6022-T4(1) sheets, all specimens exhibited greater than 15% post-hot water rinse phosphorus loss from both the upper and lower surfaces over all the conditions.

The results of Example 5 suggest that, at least for the tested conditions, the A:B ratio of the PCOA used in the corresponding steps may exert a temperature independent influence bonding performance for 6022-T4(1) sheets, with the effect being more pronounced when BONDERITE® C-IC 243 was used for deoxidization as compared to GARDOCLEAN® S5149. This effect was not observed in Example 5 for the 5754-O sheets. Also, the Example 5 results suggest that, for both 6022-T4(1) and 5754-O sheets, the choice of acid deoxidizer formulation may influence post-hot water rinse phosphorus retention results for both the upper and lower surfaces. More broadly, results from the experimental work clearly demonstrates that, by adjusting deoxidizer, concentrations, component ratios and PMT, suitable treatment weight and bond durability performance can be achieved.

Example 6

Several aluminum alloy sheet products (the "coils") were produced from both 5xxx and 6xxx alloys in a full-scale plant production trial. The coils were alkaline cleaned by immersion into an alkaline solution (Chemetall Kleen 4010) to remove residual lubricants and general contamination.

The alkaline cleaning was performed for a residence time of 4-8 seconds, and at a temperature of 130° F. After the alkaline cleaning, the coils were rinsed with deionized water.

Following the alkaline cleaning and rinse steps, the coils were deoxidized by immersion in BONDERITE® C-IC 243. The deoxidizing was performed for a residence time of 8-16 seconds, and at a temperature of 170° F. After the deoxidization step, the coils were rinsed with deionized water.

Figures 2A, 2B, 2C:
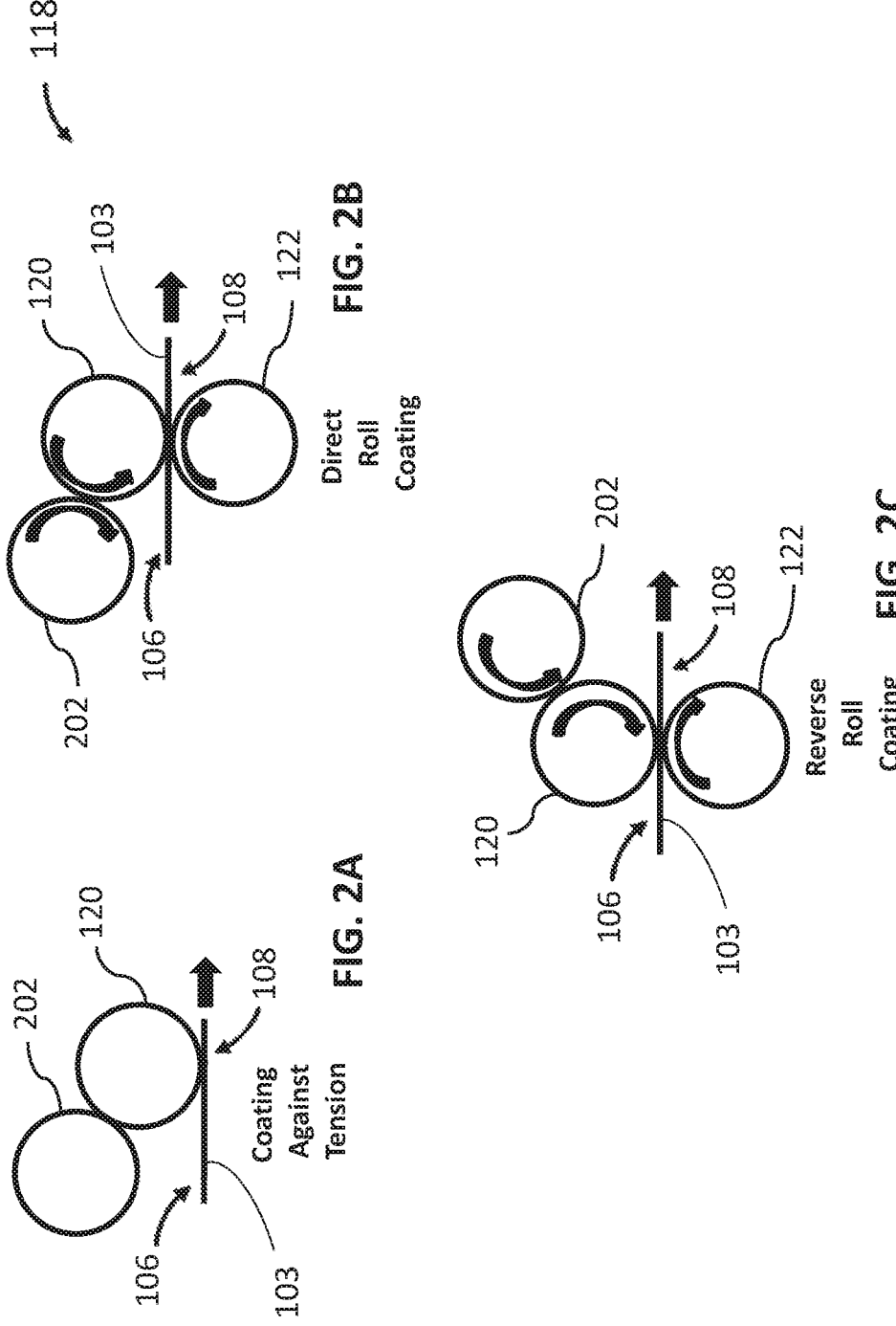
FIGS. 2A-2C are block diagrams illustrating alternative embodiments of roll coating apparatus.
Figure 3:
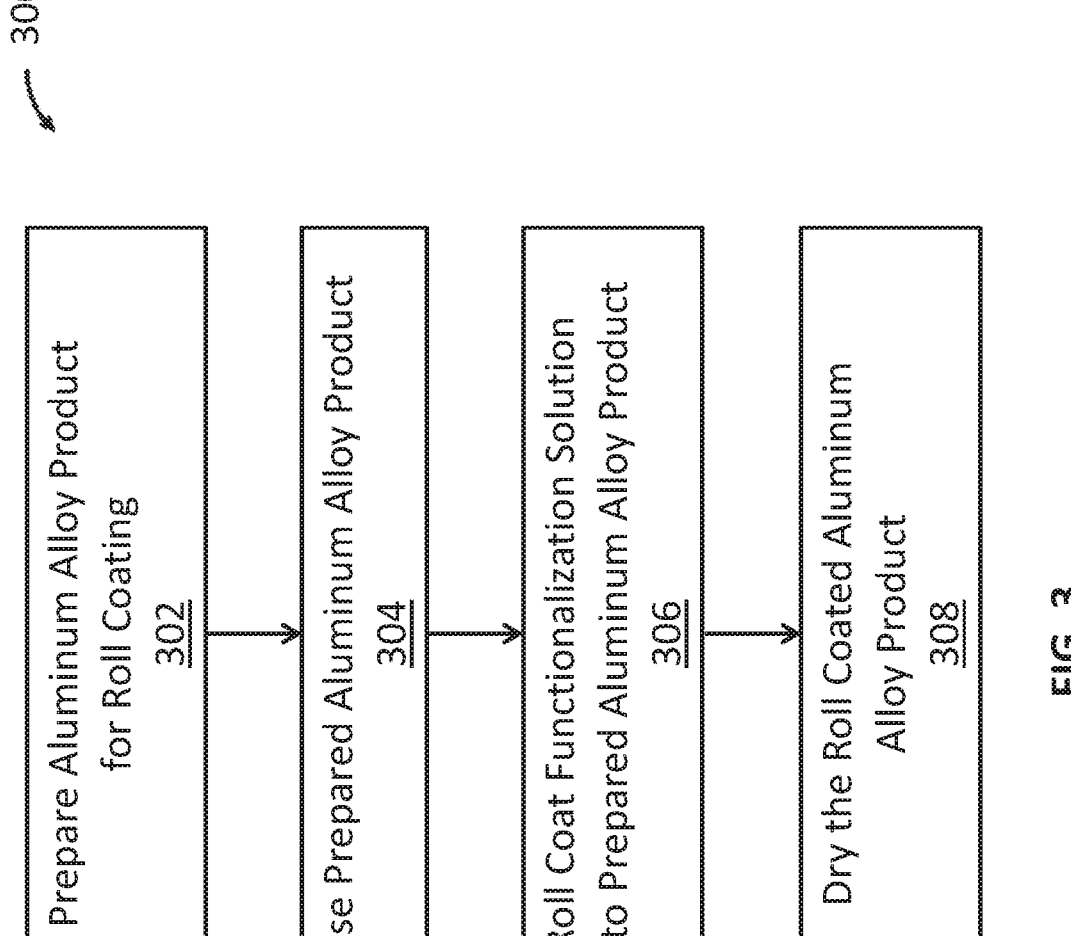
FIG. 3 is a flow chart illustrating one embodiment of a method for producing prepared aluminum alloy products in accordance with the present disclosure.
Figure 4:
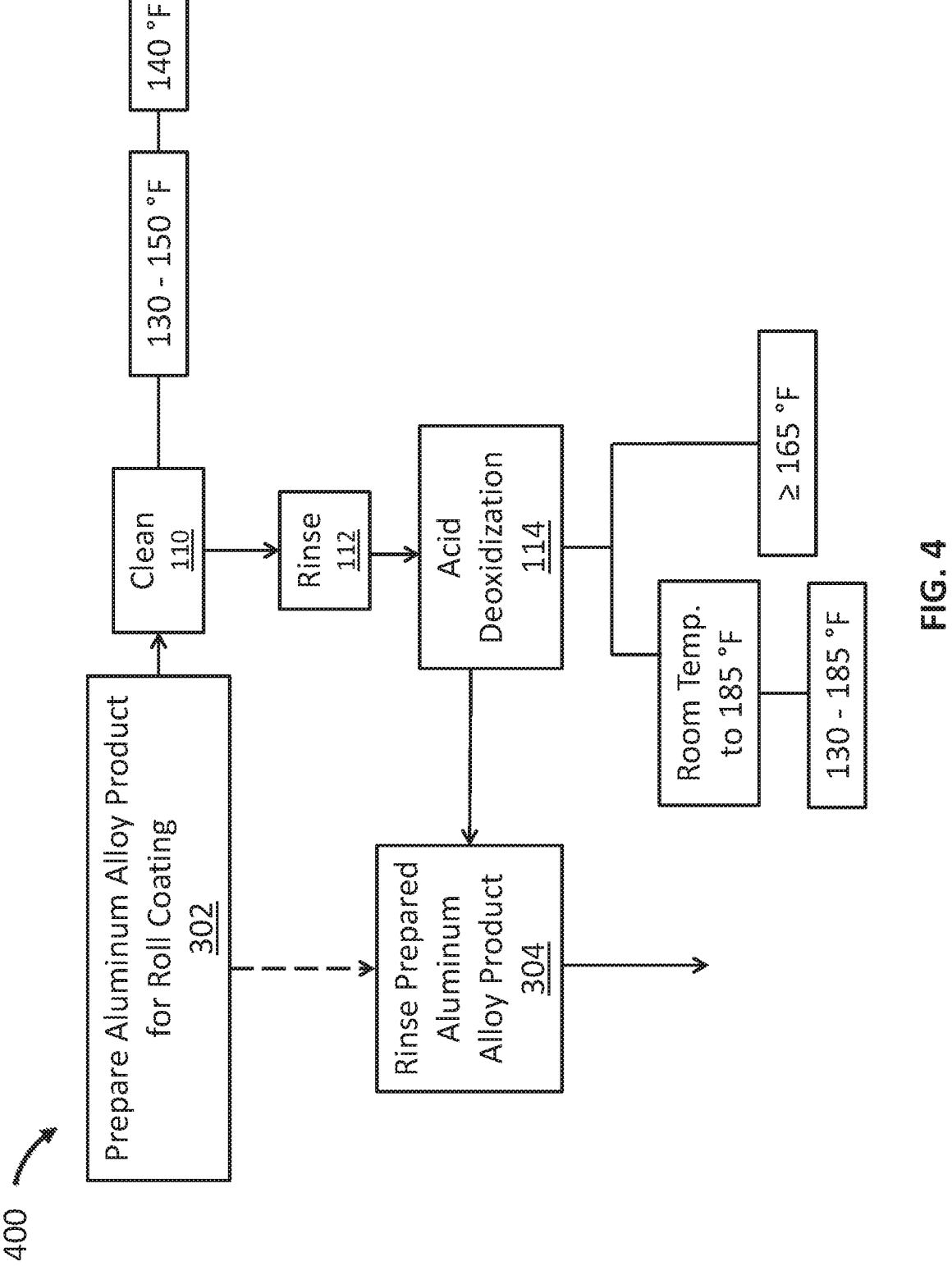
FIG. 4 is a flow chart illustrating one embodiment of the preparing step of FIG. 3.
Figure 5:
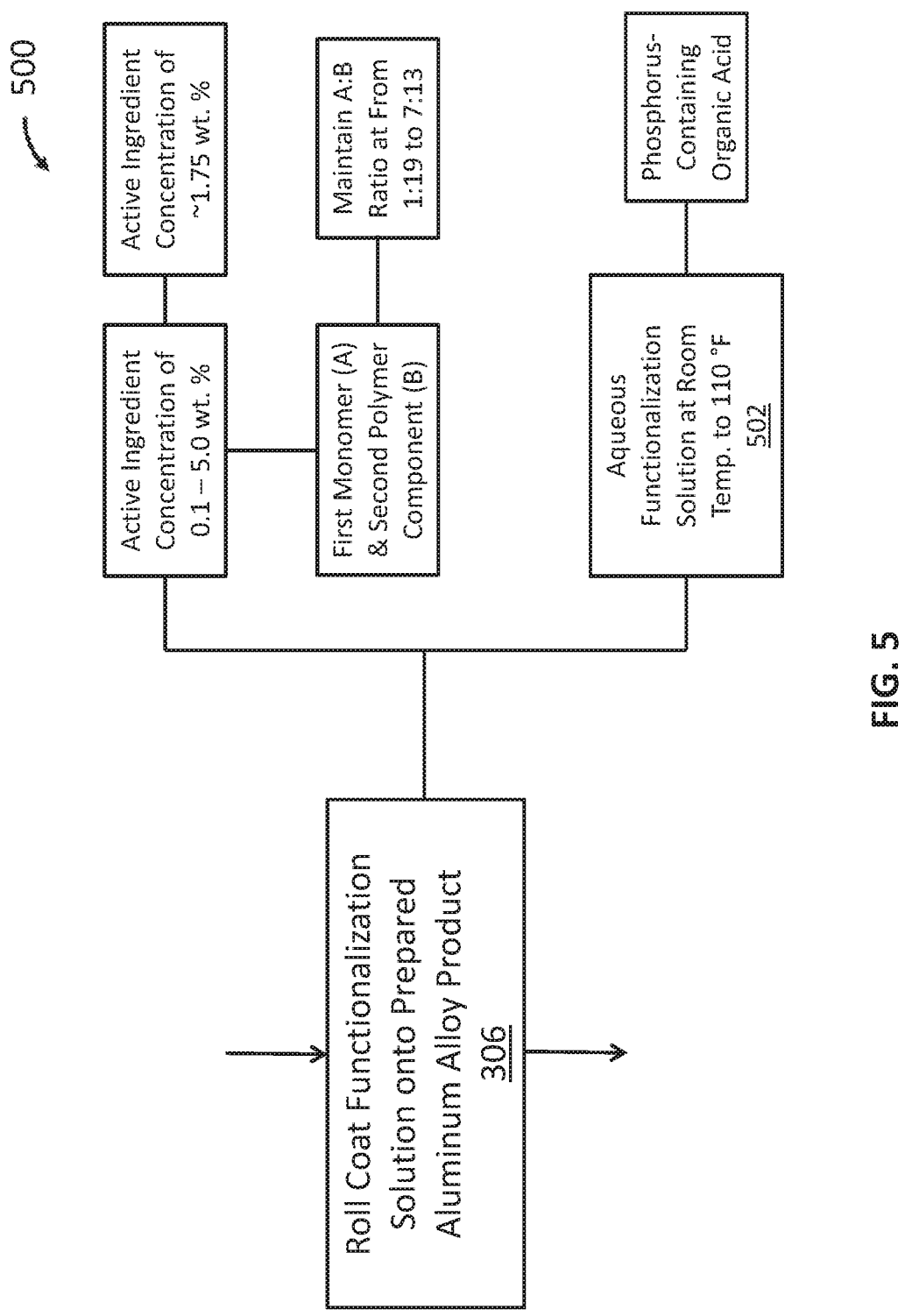
FIG. 5 is a flow chart illustrating one embodiment of the roll coating step of FIG. 3.
Figure 6:
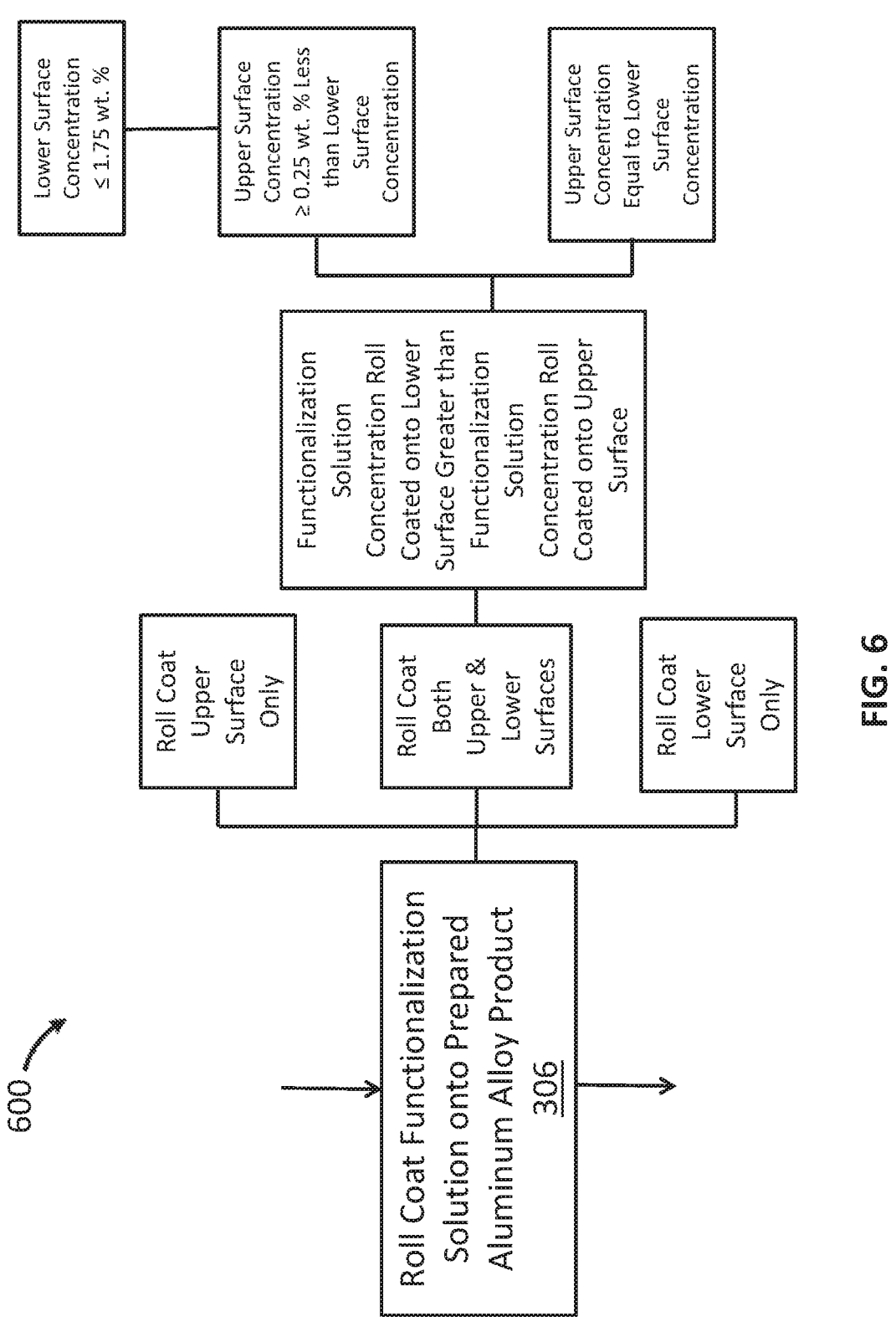
FIG. 6 is a flow chart illustrating an additional embodiment of the roll coating step of FIG. 3.
Figure 7:
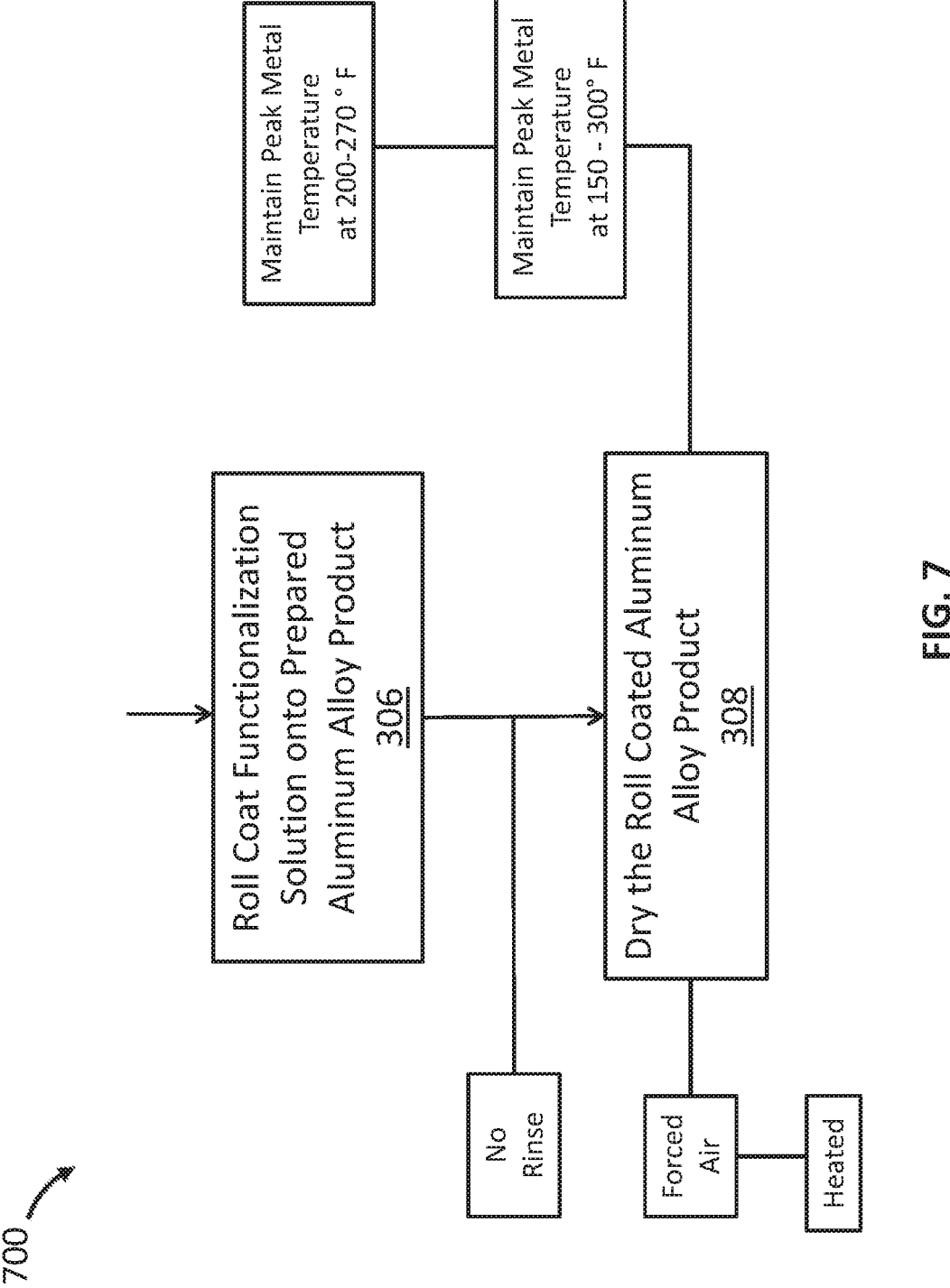
FIG. 7 is a flow chart illustrating one embodiment of the drying step of FIG. 3.

After the deoxidization and rinsing steps, the coils were contacted with an aqueous functionalization solution in the form of a phosphorus-containing organic acid (PCOA) solution maintained at a temperature of 75-90° F. The coils were contacted with the PCOA via a direct roll coating application method (see, e.g., FIG. 2B). The PCOA included a solution mixture of active ingredients including a first monomer component (component "A") and a second polymer component ("B"). Component A was a polymer, as per U.S. Pat. No. 6,167,609, and component B was a copolymer, as per U.S. Pat. No. 6,020,030. The amount of component A exceeded the amount of component B in the solution. Two aqueous functionalization treatment baths were used ("Treatment #1" and "Treatment #2"). Treatment #1 included (1) exposing the top surface of the coil to an aqueous functionalization solution having a total concentration of active ingredients of 0.625 wt. % (i.e., [A+B]=0.625 wt. %) at an A:B ratio of 35:65, and (2) exposing the bottom surface of the coil to an aqueous functionalization solution having a total concentration of active ingredients of 0.625 wt. % at an A:B ratio of 25:75. Treatment #2 included exposing the top surface of the coil to an aqueous functionalization solution having a total concentration of active ingredients of 0.4 wt. % at an A:B ratio of 50:50, and (2) exposing the bottom surface of the sheet products to an aqueous functionalization solution having a total concentration of active ingredients of 0.4 wt. % at an A:B ratio of 50:50. The aqueous functionalization treatment used for each coil is indicated in Table 10A, below.

After roll coating the coils with the aqueous functionalization solutions, the coils were then dried. The drying included reaching a peak metal temperature ("PMT") of about 240° F. for all of the coils. Production data, including the gauge of the coil, the width of the coil, the total weight of coil, the total length of the coil, the treatment speed, and the total time to treat the each coil is given in Tables 10A-10B, below.

TABLE 10A

| | | | | | |
|---|---|---|---|---|---|
| | | | Example 6 Production Data | | |
| Coil No. | Alloy | Temper | Aqueous Functionalization Treatment No. | Coil Gauge (in) | Coil Width (in) |
| 1 | 6022 | T43 | Treatment #1 | 0.0315 | 72 |
| 2 | 6022 | T4E32 | Treatment #1 | 0.037 | 69.8 |
| 3 | 6022 | T43 | Treatment #2 | 0.047 | 69.1 |
| 4 | 5182 | O | Treatment #1 | 0.0645 | 54 |
| 5 | 5182 | O | Treatment #1 | 0.078 | 58 |
| 6 | 6111 | T4 | Treatment #1 | 0.098 | 72 |
| 7 | 6111 | T4 | Treatment #1 | 0.137 | 69.566 |
| 8 | 6111 | T4 | Treatment #2 | 0.126 | 64.29 |
| 9 | 6022 | T4E32 | Treatment #2 | 0.037 | 69.7 |

TABLE 10B

| | | | | |
|---|---|---|---|---|
| | | Example 6 Production Data | | |
| Coil No. | Total Weight of Coil (lbs) | Total Length of Coil (ft) | Treatment Speed (fpm) | Total Treatment Time (min) |
| 1 | 17,635 | 6,679 | 300 | 22.3 |
| 2 | 9,205 | 3,037 | 300 | 10.1 |
| 3 | 12,966 | 3.409 | 300 | 11.4 |
| 4 | 6,800 | 1,704 | 300 | 5.7 |
| 5 | 15,630 | 3,005 | 300 | 10 |
| 6 | 14,965 | 1,812 | 300 | 6 |
| 7 | 16,315 | 1,474 | 150 | 9.8 |
| 8 | 17,758 | 1,883 | 150 | 12.6 |
| 9 | 8,500 | 2,806 | 300 | 9.4 |

Initial X-ray fluorescence (XRF) analysis for phosphorus coating weight was performed following completion of the drying. The XRF specimens were taken at the head and tail of each of the top and bottom of the sheet products. After the initial XRF analysis, the initial XRF specimens were rinsed in deionized water at 180° F. by immersion for 5 seconds, and the XRF measurement was performed again on the specimens. Results from the XRF analysis are given in Table 10C-10D, below. In this regard, Table 10C gives the XRF results in mg/m², whereas Table 10D gives percentage of phosphorus loss after the deionized water rinse, relative to the results given in Table 10C.

TABLE 10C

| | | | | |
|---|---|---|---|---|
| XRF Analysis Results (in mg/m²) After Coating | | | | |
| | Top | | Bottom | |
| Coil No. | Head | Tail | Head | Tail |
| 1 | N/A | 2.43 | 2.24 | 2.20 |
| 2 | 2.42 | 2.30 | 1.97 | 1.89 |
| 3 | 1.88 | 2.27 | N/A | 1.63 |
| 4 | 2.40 | 2.32 | 1.39 | 1.65 |
| 5 | 2.24 | 2.32 | 1.58 | 1.55 |
| 6 | 2.08 | 2.27 | 1.57 | 1.52 |
| 7 | 2.26 | 2.17 | 1.50 | 1.47 |
| 8 | 1.70 | 1.82 | 1.15 | 1.36 |
| 9 | 1.72 | 1.71 | 1.20 | 1.19 |

TABLE 10D

| | | | | |
|---|---|---|---|---|
| XRF Analysis Results (in % phosphorus loss) After Rinsing | | | | |
| | Top | | Bottom | |
| Coil No. | Head | Tail | Head | Tail |
| 1 | N/A | 31 | 31 | 29 |
| 2 | 34 | 32 | 17 | 26 |
| 3 | 24 | 25 | N/A | 16 |
| 4 | 26 | 20 | 17 | 14 |
| 5 | 21 | 23 | 14 | 17 |
| 6 | 22 | 25 | 16 | 26 |
| 7 | 27 | 22 | 14 | 16 |
| 8 | 32 | 25 | 29 | 22 |
| 9 | 33 | 40 | 28 | 34 |

Specimens from the coils were adhesively bonded and then subjected to bond durability testing (BDT) according to an automotive industry standard cyclical corrosion exposure test. This bond durability testing included a combination of applied lap shear stress and environmental exposure (the "BDT test"). The bond durability tests were performed with specimens taken at both the head and tail of the coils for an average of 3 specimens, the results of which are given in Table 10E, below.

TABLE 10E

| Example 6 Average Bond Durability Cycles Survived | | |
|---|---|---|
| Coil No. | Head | Tail |
| 1 | 45 | 45 |
| 2 | 45 | 45 |
| 3 | 45 | 45 |
| 4 | 45 | 45 |
| 5 | 45 | 45 |
| 6 | 45 | 45 |
| 7 | 45 | 45 |
| 8 | 45 | 45 |
| 9 | 45 | 45 |

Whereas particular embodiments of this disclosure have been described above for purposes of illustration, it will be evident to those skilled in the art that numerous variations on the details of the present disclosure may be made without departing from the scope of the disclosure as defined in the appended claims.

What is claimed is:

1. A method comprising:
(a) preparing an aluminum alloy product for roll coating having an upper surface and a lower surface, wherein the preparing comprises:
   (i) contacting the aluminum alloy product with an alkaline cleaning solution;
   (ii) first rinsing the aluminum alloy product;
   (iii) contacting the aluminum alloy product with an acidic solution; and
   (iv) second rinsing the aluminum alloy product;
(b) roll coating an aqueous functionalization solution onto the upper surface and the lower surface of the prepared aluminum alloy product, wherein the roll coating comprises:
   (i) contacting an upper surface of the prepared aluminum alloy product with a first roller, wherein the first roller is in liquid communication with a first bath comprising a first aqueous functionalization solution having a first concentration of active ingredients; and
   (ii contacting a lower surface of the prepared aluminum alloy product with a second roller, wherein the second roller is in liquid communication with a second bath comprising a second aqueous functionalization solution having a second concentration of the active ingredients;
(c) drying the roll coated aluminum alloy product, wherein the drying includes maintaining a peak metal temperature from 150° F. to 300° F.;
wherein the active ingredients comprises a monomer component and a copolymer component;
wherein the first concentration of the active ingredients of the first aqueous functionalization solution is from 0.1-4.75 wt. %;

wherein the second concentration of the active ingredients of the second aqueous functionalization solution is from 0.35-5.0 wt. %;
wherein the first concentration is at least 0.25 wt. % less than the second concentration of active ingredients;
wherein, at least partially due to the first concentration, the upper surface of the aluminum alloy product realizes a post-drying coating weight of from 0.21 to 3.55 $mg/m^2$;
wherein, at least partially due to the second concentration, the lower surface of the aluminum alloy product realizes a post-drying coating weight of from 0.21 to 3.55 $mg/m^2$;
wherein the first aqueous functionalization solution comprises a first ratio of the monomer component to the copolymer component, wherein the first ratio of the monomer component to the copolymer component is from 1:19 to 7:13 (monomer component: copolymer component);
wherein the second aqueous functionalization solution comprises a second ratio of the monomer component to the copolymer component, wherein the second ratio of the monomer component to the copolymer component is different than the first ratio.

2. The method of claim 1, wherein the contacting step (a) (iii) comprises maintaining the acidic solution at a temperature of from 130 to 185° F.

3. The method of claim 1, wherein the contacting step (a) (iii) comprises maintaining the acidic solution at a temperature of at least 165° F.

4. The method of claim 1, wherein the drying step (c) is performed in the absence of rinsing after the roll coating step (b).

5. The method of claim 1, wherein the alkaline cleaning solution of step (a) (i) is maintained at a temperature of from 125° F. to 175° F.

6. The method of claim 1, wherein the alkaline cleaning solution of step (a) (i) comprises potassium hydroxide.

7. The method of claim 1, wherein the contacting step (a) (i) is completed without etching of the aluminum alloy product.

8. The method of claim 7, wherein the contacting step (a) (i) duration is from 1 second to 4 minutes.

9. The method of claim 1, wherein the aluminum alloy product is a 5xxx, 6xxx, or 7xxx aluminum alloy product.

10. The method of claim 9, wherein the aluminum alloy product is a 5xxx aluminum alloy product.

11. The method of claim 10, wherein the 5xxx aluminum alloy product is a 5754 aluminum alloy product.

12. The method of claim 9, wherein the aluminum alloy product is a 6xxx aluminum alloy product.

13. The method of claim 12, wherein the 6xxx aluminum alloy product is a 6111 aluminum alloy product.

14. The method of claim 12, wherein the 6xxx aluminum alloy product is a 6022 aluminum alloy product.

* * * * *